US009217065B2

(12) United States Patent
Shoemake et al.

(10) Patent No.: US 9,217,065 B2
(45) Date of Patent: *Dec. 22, 2015

(54) BINDER COMPOSITIONS FOR MAKING FIBERGLASS PRODUCTS

(75) Inventors: Kelly A. Shoemake, Atlanta, GA (US); Benjamin D. Gapud, Snellville, FL (US); Ramji Srinivasan, Alpharetta, GA (US); Arun Narayan, Lawrenceville, GA (US); Ahmed A. Iman, Clarkston, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/228,917

(22) Filed: Sep. 9, 2011

(65) Prior Publication Data

US 2012/0064323 A1 Mar. 15, 2012

Related U.S. Application Data

(63) Continuation-in-part of application No. 12/959,136, filed on Dec. 2, 2010, and a continuation-in-part of application No. 12/534,319, filed on Aug. 3, 2009, which is a continuation-in-part of application No. 11/454,326, filed on Jun. 16, 2006, now Pat. No. 7,803,879, and a continuation-in-part of application No. 11/454,327, filed on Jun. 16, 2006, now Pat. No. 7,795,354.

(60) Provisional application No. 61/265,956, filed on Dec. 2, 2009.

(51) Int. Cl.
| | |
|---|---|
| C08J 5/10 | (2006.01) |
| C08J 5/04 | (2006.01) |
| C08J 5/24 | (2006.01) |
| C08L 33/02 | (2006.01) |
| C09J 133/02 | (2006.01) |
| D04H 3/004 | (2012.01) |

(52) U.S. Cl.
CPC .. *C08J 5/10* (2013.01); *C08J 5/043* (2013.01); *C08J 5/24* (2013.01); *C08L 33/02* (2013.01); *C09J 133/02* (2013.01); *D04H 3/004* (2013.01); *C08J 2325/08* (2013.01); *C08J 2400/24* (2013.01)

(58) Field of Classification Search
USPC ................... 442/59, 180; 525/65, 71
See application file for complete search history.

(56) References Cited

U.S. PATENT DOCUMENTS

| | | | |
|---|---|---|---|
| 3,880,811 A | 4/1975 | Kaupp | |
| 4,258,098 A | 3/1981 | Bondoc et al. | |
| 4,571,356 A | 2/1986 | White et al. | |
| 5,039,719 A * | 8/1991 | Watanabe et al. | 523/213 |
| 5,362,842 A | 11/1994 | Graves et al. | |
| 5,389,716 A | 2/1995 | Graves | |
| 5,569,686 A | 10/1996 | Makati et al. | |
| 5,614,597 A | 3/1997 | Bower | |
| 5,902,862 A | 5/1999 | Allen | |
| 5,914,365 A | 6/1999 | Chang et al. | |
| 6,384,116 B1 | 5/2002 | Chan et al. | |
| 6,511,561 B1 | 1/2003 | Kohlhammer et al. | |
| 7,547,745 B2 * | 6/2009 | Valette | 525/71 |
| 7,608,670 B2 | 10/2009 | Shooshtari | |
| 7,655,711 B2 * | 2/2010 | Swift et al. | 524/14 |
| 7,803,855 B2 | 9/2010 | Kintzley et al. | |
| 7,807,771 B2 * | 10/2010 | Swift et al. | 527/312 |
| 7,888,445 B2 * | 2/2011 | Swift et al. | 527/312 |
| 7,947,765 B2 * | 5/2011 | Swift et al. | 524/14 |
| 8,182,648 B2 * | 5/2012 | Swift et al. | 156/336 |
| 2002/0006515 A1 * | 1/2002 | Luttrull | 428/416 |
| 2003/0079847 A1 | 5/2003 | Howle et al. | |
| 2004/0254285 A1 | 12/2004 | Rodrigues et al. | |
| 2007/0292618 A1 | 12/2007 | Srinivasan et al. | |
| 2007/0292619 A1 | 12/2007 | Srinivasan et al. | |
| 2008/0015301 A1 | 1/2008 | Grooms et al. | |
| 2008/0108739 A1 | 5/2008 | Valette | |
| 2009/0252962 A1 | 10/2009 | Michl et al. | |
| 2010/0016143 A1 | 1/2010 | Shooshtari et al. | |
| 2011/0165398 A1 * | 7/2011 | Shoemake et al. | 428/220 |

(Continued)

FOREIGN PATENT DOCUMENTS

| | | |
|---|---|---|
| WO | 03/106561 A1 | 12/2003 |
| WO | 2007/149643 A1 | 1/2007 |

OTHER PUBLICATIONS

International Search Report and Written Opinion of the International Searching Authority for PCT/US2010/058754 mailed Aug. 25, 2011.
International Search Report and Written Opinion of the International Searching Authority for PCT/US2012/054134 mailed Feb. 27, 2013.
International Search Report and Written Opinion of PCT/US2013/030872, received on Jun. 27, 2013.

(Continued)

*Primary Examiner* — Lynda Salvatore
(74) *Attorney, Agent, or Firm* — Ram W. Sabnis

(57) ABSTRACT

Fiberglass mats, binder compositions, and methods for making the same are provided. The fiberglass mat can include a plurality of glass fibers and an at least partially cured binder composition. The binder composition, prior to at least partial curing, can include a first copolymer modified by reaction with one or more base compounds. The first copolymer can include one or more unsaturated carboxylic acids, one or more unsaturated carboxylic anhydrides, or a combination thereof, and one or more vinyl aromatic derived units. The first copolymer can have a weight average molecular weight (Mw) of about 500 to about 200,000. The first copolymer can be present in an amount ranging from about 60 wt % to about 95 wt %, based on a combined weight of the first copolymer and the one or more base compounds.

23 Claims, No Drawings

(56) References Cited

U.S. PATENT DOCUMENTS

2011/0171473 A1 7/2011 Kasmayr et al.
2012/0064323 A1 3/2012 Shoemake et al.
2012/0183723 A1* 7/2012 Srinivasan et al. ............ 428/106
2012/0252937 A1 10/2012 Cannon et al.

OTHER PUBLICATIONS

International Search Report and Written Opinion of PCT/US2013/021094, received on Apr. 25, 2013.

* cited by examiner

BINDER COMPOSITIONS FOR MAKING FIBERGLASS PRODUCTS

CROSS-REFERENCE TO RELATED APPLICATIONS

This application is a continuation-in-part of U.S. patent application having Ser. No. 12/959,136, filed on Dec. 2, 2010, and published as U.S. Publication No. 2011/0165398, which claims priority to U.S. Provisional Patent Application having Ser. No. 61/265,956, filed Dec. 2, 2009. This application is also a continuation-in-part of U.S. patent application having Ser. No. 12/534,319 filed on Aug. 3, 2009, and published as U.S. Publication No. 2010/0029160, which is a continuation-in-part of U.S. patent application having Ser. No. 11/454,326, filed on Jun. 16, 2006, and issued as U.S. Pat. No. 7,803,879 and a continuation-in-part of U.S. patent application having Ser. No. 11/454,327, filed on Jun. 16, 2006, and issued as U.S. Pat. No. 7,795,354. All of which are incorporated by reference herein.

BACKGROUND

1. Field

Embodiments described herein generally relate to binder compositions. More particularly, such embodiments relate to binder compositions for making fiberglass products.

2. Description of the Related Art

Sheets or mats of non-woven fibers, e.g., glass fibers ("fiberglass"), are finding increasing application in the building materials industry. Fiberglass mats are typically used in, among others, insulation materials, flooring products, wall panel products, and roofing products. Fiberglass mats are usually made commercially by a wet-laid process that involves the addition of a binder or adhesive solution to the glass fiber mat to bind and hold the fibers together.

Depending on the particular fiberglass product and its particular application, different mechanical properties are desirable and/or must be met, such as tear strength, dry tensile strength, and/or wet tensile strength. An important property for a fiberglass mat in roofing material applications, for example, is tear strength. Tear strength provides an estimate as to the ability of a roofing product, such as a shingle incorporating the fiberglass mat, to resist wind forces. As the tear strength of a fiberglass mat increases, the level of wind forces the roofing product can resist also increases, thereby providing a more reliable and durable roofing product. Frequently, fiberglass mats do not meet minimum tear strength specifications that are required for the fiberglass mat to be used in roofing applications.

There is a need, therefore, for fiberglass mats having improved strength properties and methods for making same.

SUMMARY

Fiberglass mats, binder compositions, and methods for making the same are provided. In at least one specific embodiment, the fiberglass mat can include a plurality of glass fibers and an at least partially cured binder composition. The binder composition, prior to at least partial curing, can include a first copolymer modified by reaction with one or more base compounds. The first copolymer can include one or more unsaturated carboxylic acids, one or more unsaturated carboxylic anhydrides, or a combination thereof, and one or more vinyl aromatic derived units. The first copolymer can have a weight average molecular weight (Mw) of about 500 to about 200,000. The first copolymer can be present in an amount ranging from about 60 wt % to about 95 wt %, based on a combined weight of the first copolymer and the one or more base compounds.

In at least one specific embodiment, the binder composition can include a first copolymer modified by reaction with one or more base compounds. The first copolymer can include one or more unsaturated carboxylic acids, one or more unsaturated carboxylic anhydrides, or a combination thereof, and one or more vinyl aromatic derived units. The first copolymer can have a weight average molecular weight (Mw) of about 500 to about 200,000. The first copolymer can be present in an amount ranging from about 60 wt % to about 95 wt %, based on a combined weight of the first copolymer and the one or more base compounds.

In at least one specific embodiment, the fiberglass mat can include a plurality of glass fibers and an at least partially cured binder composition. The binder composition, prior to at least partial curing, can include a first copolymer comprising styrene maleic anhydride modified by reaction with one or more base compounds, wherein the first copolymer has a weight average molecular weight (Mw) of about 500 to about 200,000, and wherein the styrene maleic anhydride is present in an amount ranging from about 60 wt % to about 95 wt %, based on a combined weight of the styrene maleic anhydride and the one or more base compounds.

DETAILED DESCRIPTION

The binder composition can include a copolymer or "first copolymer" of one or more unsaturated carboxylic acids, one or more unsaturated carboxylic anhydrides, or any combination thereof, and one or more vinyl aromatic derived units, where the copolymer is modified by reaction with one or more base compounds. Illustrative unsaturated carboxylic acids can include, but are not limited to, maleic acid, aconitic acid, itaconic acid, acrylic acid, methacrylic acid, crotonic acid, isocrotonic acid, citraconic acid, fumaric acid, polymers thereof, or any combination thereof. Illustrative unsaturated carboxylic anhydrides can include, but are not limited to, maleic anhydride, aconitic anhydride, itaconic anhydride, acrylic anhydride, methacrylic anhydride, crotonic anhydride, isocrotonic anhydride, citraconic anhydride, polymers thereof, or any combination thereof.

The vinyl aromatic derived units can include, but are not limited to, styrene, alpha-methylstyrene, vinyl toluene, or any combination thereof. For example, the vinyl aromatic derived units can be derived from styrene and/or derivatives thereof. In another example, the vinyl aromatic derived units can be derived from styrene. In another example, the vinyl aromatic derived units can be derived from styrene and at least one of alpha-methylstyrene and vinyl toluene.

In at least one example, the first copolymer can be or include a copolymer of styrene and maleic anhydride and/or maleic acid ("SMA"). In another example, the first copolymer can be or include a copolymer of styrene and acrylic acid. In another example, the first copolymer can be or include styrene and polyacrylic acid. In another example, the first copolymer can be or include a copolymer of styrene and methacrylic acid. In another example, the first copolymer can be or include a copolymer of styrene and itaconic acid. In another example, the first copolymer can include a blend of the one or more unsaturated carboxylic acids, one or more unsaturated carboxylic anhydrides, or any combination thereof and one or more vinyl aromatic derived units and one or more other polymers. For example, the first copolymer can include the copolymer of the one or more unsaturated carboxylic acids, one or more unsaturated carboxylic anhydrides, or any combination thereof and one or more vinyl aromatic derived units and at least one of polyacrylic acid and styrene acrylic acid. In another example, the first copolymer can be or include a terpolymer of styrene and two or more of maleic anhydride, maleic acid, acrylic acid, methacrylic acid, and itaconic acid. As such, the term "first copolymer," as used herein, can be or include a terpolymer. Said another way, the term "first copolymer," as used herein, can be or include polymers derived from two or more monomers.

In one or more embodiments, the first copolymer can include from about 7 mol % to about 50 mol % of the one or more unsaturated carboxylic acids, one or more unsaturated carboxylic anhydrides, or any combination thereof and conversely from about 50 mol % to about 93 mol % of the one or more vinyl aromatic derived units. In one or more embodiments, the first copolymer can include from about 20 mol % to about 40 mol % of the one or more unsaturated carboxylic acids, one or more unsaturated carboxylic anhydrides, or any combination thereof and conversely from about 60 mol % to about 80 mol % of the one or more vinyl aromatic derived units. In one or more embodiments, the one or more unsaturated carboxylic acids, one or more unsaturated carboxylic anhydrides, or any combination thereof can be present in the first copolymer in an amount ranging from a low of about 7 mol %, about 10 mol %, about 12 mol %, or about 15 mol % to a high of about 30 mol %, about 35 mol %, about 40 mol %, or about 45 mol %, based on the total weight of the one or more unsaturated carboxylic acids, one or more unsaturated carboxylic anhydrides, or any combination thereof and the one or more vinyl aromatic derived units. In one or more embodiments, the one or more vinyl aromatic derived units can be present in the first copolymer in an amount ranging from a low of about 50 mol %, about 55 mol %, about 60 mol %, or about 65 mol % to a high of about 75 mol %, about 80 mol %, about 85 mol %, about 90 mol %, or about 95 mol %, based the total weight of the one or more unsaturated carboxylic acids, one or more unsaturated carboxylic anhydrides, or any combination thereof and the one or more vinyl aromatic derived units.

The molecular weight of the first copolymer can vary within wide limits. Preferably, the first copolymer has a weight average molecular weight ("Mw") between about 500 and about 200,000. For example, the first copolymer can have a Mw ranging from a low of about 500, about 750, about 1,000, about 1,500, about 2,000, about 2,500, about 3,000, or about 4,000 to a high of about 50,000, about 60,000, about 70,000, about 80,000, about 90,000, about 100,000, about 110,000, about 120,000, about 130,000 about 140,000, about 150,000, about 160,000, about 170,000, about 180,000, or about 190,000. In another example, the first copolymer can have a Mw ranging from about 500 to about 60,000, about 1,000 to about 60,000, about 2,000 to about 10,000, about 10,000 to about 80,000, or about 1,500 to about 60,000. In another example, the first copolymer can have a Mw ranging from about 500 to about 10,000, about 1,000 to about 9,000, about 1,500 to about 7,000, or about 2,500 to about 6,000. In another example, the first copolymer can have a Mw ranging from a low of about 500, about 700, about 900, about 1,000, about 1,100, about 1,300, or about 1,500 to a high of about 3,000, about 3,200, about 3,400, about 3,600, about 3,800, or about 4,000. In another example, the first copolymer can have a Mw ranging from a low of about 500, about 700, about 900, about 1,000, about 1,100, about 1,300, or about 1,500 to a high of about 4,500, about 4,700, about 5,000, about 5,300, about 5,700, about 6,000, about 6,300, about 6,500, about 6,700, or about 7,000. In another example, the first copolymer can have a Mw ranging from a low of about 1,000, about 1,500, about 2,000, about 2,500, or about 3,000 to a high of about 4,000, about 5,000, about 6,000, about 7,000, about 8,000, about 9,000, or about 10,000. In another example, the first copolymer can have a Mw of about 500 to about 10,000, about 1,000 to about 7,000, about 2,000 to about 6,000, about 2,000 to about 4,000, about 2,500 to about 3,500, about 3,000 to about 5,000, or about 4,500 to about 5,500. In another example, the first copolymer can have a Mw less than about 30,000, less than about 25,000, less than about 20,000, less than about 17,000, less than about 15,000, less than about 12,000, less than about 10,000, less than about 9,000, less than about 8,000, less than about 7,000, less than about 6,000, less than about 5,000, less than about 4,500, less than about 4,000, or less than about 3,500.

In one or more embodiments, the first copolymer can include a major amount (greater than 50 mol %, or greater than about 60 mol %, or greater than about 70 mol %, or greater than about 80 mol %, or greater than about 90 mol %, based on the combined amount of unsaturated carboxylic acids and/or unsaturated carboxylic anhydrides) of maleic anhydride and/or maleic acid and a minor amount (less than 50 mol %, or less than about 40 mol %, or less than about 30 mol %, or less than about 20 mol %, based on the combined amount of the unsaturated carboxylic acids and/or unsaturated carboxylic anhydrides) of one or more other unsaturated carboxylic acids such as aconitic acid, itaconic acid, acrylic acid, methacrylic acid, crotonic acid, isocrotonic acid, citraconic acid, fumaric acid, or any combination thereof and/or of one or more other unsaturated carboxylic anhydrides such as maleic anhydride, aconitic anhydride, itaconic anhydride, acrylic anhydride, methacrylic anhydride, crotonic anhydride, isocrotonic anhydride, citraconic anhydride, polymers thereof, or any combination thereof. The copolymer can also contain a minor amount (less than 50 mol %, or less than about 40 mol %, or less than about 30 mol %, or less than about 20 mol %, based on the amount of the one or more vinyl aromatic derived units) of another hydrophobic vinyl monomer. Another "hydrophobic vinyl monomer" is a monomer that typically produces, as a homopolymer, a polymer that is water-insoluble or capable of absorbing less than 10% by weight water. Suitable hydrophobic vinyl monomers are exemplified by (i) vinyl esters of aliphatic acids such as vinyl acetate, vinyl propionate, vinyl butyrate, vinyl caproate, vinyl 2-ethylhexanoate, vinyl laurate, and vinyl stearate; (ii) diene monomers such as butadiene and isoprene; (iii) vinyl monomers and halogenated vinyl monomers such as ethylene, propylene, cyclohexene, vinyl chloride and vinylidene chloride; (iv) acrylates and alkyl acrylates, such as methyl acrylate, ethyl acrylate, n-propyl acrylate, isopropyl acrylate, n-butyl acrylate, isobutyl acrylate, tert-butyl acrylate, n-hexyl acrylate, cyclohexyl acrylate, hydroxyethylacrylate, hydroxyethylmethacrylate, and 2-ethylhexyl acrylate; and (v) nitrile monomers such as acrylonitrile and methacrylonitrile, and mixtures thereof.

In one or more embodiments, the first copolymer can be SMA. In one or more embodiments, the first copolymer can include at least 10 wt %, at least 20 wt %, at least 30 wt %, at least 40 wt %, at least 50 wt %, at least 60 wt %, at least 70 wt %, at least 80 wt %, at least 90 wt %, at least 95 wt %, or about 100 wt % SMA.

Illustrative base compounds can include, but are not limited to, one or more amines, one or more amides, one or more hydroxides, one or more carbonates, or any combination thereof. Suitable amines can include, but are not limited to, ammonia, ammonium hydroxide, alkanolamines, polyamines, aromatic amines, and any combination thereof. Illustrative alkanolamines can include, but are not limited to, monoethanolamine ("MEA"), diethanolamine ("DEA"), triethanolamine ("TEA"), or any combination thereof. Preferably, the alkanolamine is a tertiary alkanolamine or more preferably triethanolamine ("TEA"). An alkanolamine is defined as a compound that has both amino and hydroxyl functional groups as illustrated by diethanolamine, triethanolamine, 2-(2-aminoethoxy)ethanol, aminoethyl ethanolamine, aminobutanol and other aminoalkanols. Illustrative aromatic amines can include, but are not limited to, benzyl amine, aniline, ortho toludine, meta toludine, para toludine, n-methyl aniline, N—N'-dimethyl aniline, di- and tri-phenyl amines, 1-naphthylamine, 2-naphthylamine, 4-aminophenol, 3-aminophenol and 2-aminophenol. Illustrative polyamines can include, but are not limited to, diethylenetriamine ("DETA"), triethylenetetramine ("TETA"), tetraethylenepentamine ("TEPA"). Other polyamines can include, for example, 1,3-propanediamine, 1,4-butanediamine, polyamidoamines, and polyethylenimines.

Other suitable amines can include, but are not limited to, primary amines ("$NH_2R_1$"), secondary amines ("$NHR_1R_2$"), and tertiary amines ("$NR_1R_2R_3$"), where each $R_1$, $R_2$, and $R_3$ is independently selected from alkyls, cycloalkyls, heterocycloalkyls, aryls, heteroaryls, and substituted aryls. The alkyl can include branched or unbranched alkyls having from 1 to about 15 carbon atoms or more preferably from 1 to about 8 carbon atoms. Illustrative alkyls can include, but are not limited to, methyl, ethyl, n-propyl, isopropyl, n-butyl, sec butyl, t-butyl, n-pentyl, n-hexyl, and ethylhexyl. The cycloalkyls can include from 3 to 7 carbon atoms. Illustrative cycloalkyls can include, but are not limited to, cyclopentyl, substituted cyclopentyl, cyclohexyl, and substituted cyclohexyl. The term "aryl" refers to an aromatic substituent containing a single aromatic ring or multiple aromatic rings that are fused together, linked covalently, or linked to a common group such as a methylene or ethylene moiety. More specific aryl groups contain one aromatic ring or two or three fused or linked aromatic rings, e.g., phenyl, naphthyl, biphenyl, anthracenyl, phenanthrenyl, and the like. In one or more embodiments, aryl substituents can have from 1 to about 20 carbon atoms. The term "heteroatom-containing," as in a "heteroatom-containing cycloalkyl group," refers to a molecule or molecular fragment in which one or more carbon atoms is replaced with an atom other than carbon, e.g., nitrogen, oxygen, sulfur, phosphorus, boron, or silicon. Similarly, the term "heteroaryl" refers to an aryl substituent that is heteroatom-containing. The term "substituted," as in "substituted aryls," refers to a molecule or molecular fragment in which at least one hydrogen atom bound to a carbon atom is replaced with one or more substituents that are functional groups such as hydroxyl, alkoxy, alkylthio, phosphino, amino, halo, silyl, and the like. Illustrative primary amines can include, but are not limited to, methylamine and ethylamine. Illustrative secondary amines can include, but are not limited to, dimethylamine and diethylamine. Illustrative tertiary amines can include, but are not limited to, trimethylamine and triethylamine. Illustrative amides can include, but are not limited to, acetamide, ethanamide, dicyandiamide, and the like, or any combination thereof.

Suitable hydroxides can include one or more alkali and/or alkaline earth metal hydroxides and/or carbonates. Illustrative hydroxides can include, but are not limited to, sodium hydroxide, potassium hydroxide, ammonium hydroxide (e.g., aqueous ammonia), lithium hydroxide, cesium hydroxide, barium hydroxide, calcium hydroxide, magnesium hydroxide, aluminum hydroxide, or any combination thereof.

Illustrative carbonates can include, but are not limited to, sodium carbonate, sodium bicarbonate, potassium carbonate, and ammonium carbonate.

The first copolymer of the vinyl aromatic derived units and the unsaturated carboxylic acids and/or the unsaturated carboxylic anhydrides can be combined with the one or more base compounds in any desired amount. For example, the binder composition can include about 1 wt % to about 99 wt % of the first copolymer and conversely about 99 wt % to about 1 wt % of the one or more base compounds, based on the combined weight of the first copolymer and the one or more base compounds. For example, the amount of the first copolymer in the binder composition can range from a low of about 5 wt %, about 10 wt %, about 15 wt %, about 20 wt %, about 25 wt % about 30 wt %, about 35 wt %, about 40 wt %, or about 45 wt % to a high of about 60 wt %, about 65 wt %, about 70 wt %, about 75 wt %, about 80 wt %, about 85 wt %, about 90 wt %, or about 95 wt %, based on the combined weight of the first copolymer and the one or more base compounds. In another example, the amount of the one or more base compounds can range from a low of about 5 wt %, about 10 wt %, about 15 wt %, about 20 wt %, about 25 wt % about 30 wt %, about 35 wt %, about 40 wt %, or about 45 wt % to a high of about 60 wt %, about 65 wt %, about 70 wt %, about 75 wt %, about 80 wt %, about 85 wt %, about 90 wt %, or about 95 wt %, based on the combined weight of the first copolymer and the one or more base compounds. In another example, the first copolymer can include from about 5 wt % to about 45 wt % of the one or more base compounds, or about 10 wt % to about 40 wt % of the one or more base compounds, or about 25 wt % to about 35 wt % of the one or more base compounds, or about 5 wt % to about 15 wt % of the one or more base compounds, based on the combined weight of the first copolymer and the one or more base compounds.

If the first copolymer of the one or more unsaturated carboxylic acids, one or more unsaturated carboxylic anhydrides, or any combination thereof, and one or more vinyl aromatic derived units is modified by reaction with two or more base compounds, the two or more base compounds can be present in any desired amount or ratio relative to one another. For example, if a first and second base compound are present, the first base compound can be present in an amount ranging from about 1 wt % to about 99 wt %, based on the combined weight of the first and second base compounds. In another example, if the first and second base compounds are present, the first base compound can be present in an amount ranging from a low of about 2 wt %, about 5 wt %, about 15 wt %, or about 25 wt % to a high of about 50 wt %, about 60 wt %, about 70 wt %, or about 90 wt %, based on the combined weight of the first and second base compounds. In another example, if the first and second base compounds are present, the first base compound can be present in an amount ranging from a low of about 2 wt %, about 5 wt %, or about 10 wt % to a high of about 15 wt %, about 25 wt %, about 35 wt %, or about 50 wt %, based on the combined weight of the first and second base compounds. Similarly, if three or more base compounds are present, the three or more base compounds can be present in any desired proportion or amount with respect to one another.

In at least one example, the first copolymer can be modified by reaction with a mixture of ammonia and at least one of monoethanolamine, diethanolamine, and triethanolamine, where the ammonia can be present in an amount ranging from about 1 wt % to about 99 wt % and conversely the at least one of monoethanolamine, diethanolamine, and triethanolamine can be present in an amount ranging from about 99 wt % to about 1 wt %, based on the combined weight of the ammonia and the at least one of monoethanolamine, diethanolamine, and triethanolamine. In another example, the first copolymer can be modified by reaction with a mixture of ammonia and two or more of monoethanolamine, diethanolamine, and triethanolamine. In such a mixture, the ammonia can be present, for example, in an amount ranging from about 10 wt % to about 40 wt %, e.g., about 33 wt %, and the two or more of monoethanolamine, diethanolamine, and triethanolamine can be present in an amount ranging from about 80 wt % to about 60 wt %, e.g., about 67 wt %, based on the combined weight of the ammonia and the two or more of monoethanolamine, diethanolamine, and triethanolamine. In at least one example, if two or more base compounds are reacted with the first copolymer and the base compounds include monoethanolamine, the monoethanolamine can be present in an amount less than about 15 wt %, less than about 10 wt %, less than about 7 wt %, less than about 5 wt %, less than about 3 wt %, less than about 1 wt %, or less than about 0.5 wt % monoethanolamine, based on the combined weight of the base compounds. In another example, the first copolymer can be modified by reaction with ammonia, e.g., an aqueous solution of ammonia, where the ammonia can be preset in an amount ranging from about 5 wt % to about 40 wt %, or about 5 wt % to about 15 wt %, or about 10 wt % to about 30 wt %, or about 7 wt % to about 20 wt %, based on the combined weight of the first copolymer and the ammonia. In another example, the first copolymer can be modified by reaction with one or more amines other than ammonia. In other words, the binder composition containing the first copolymer can be free from any intentionally added ammonia. In another example, the first copolymer can be modified by reaction with one or more base compounds other than an amine such as one or more hydroxides or carbonates. Said another way, the first copolymer can be modified by reaction with one or more hydroxides, carbonates, or a combination thereof, in the absence of any intentionally added amines.

The binder composition that includes the first copolymer modified by reaction with the one or more base compounds can have a pH ranging from a low of about 4, about 4.5, about 5, or about 5.5 to a high of about 7, about 8, about 9, or about 10. For example, the binder composition can have a pH of about 5 to about 7, about 5.5 to about 6.5, or about 5.7 to about 6.3. The binder composition that includes the first copolymer modified by reaction with the one or more base compounds can have a viscosity ranging from a low of about 50 centipoise ("cP"), about 100 cP, about 200, cP, about 300 cP, about 500 cP, about 750 cP, or about 900 cP to a high of about 1,100 cP, about 1,300 cP, about 1,500 cP, about 1,700 cP, about 2,000 cP, about 2,250 cP, or about 2,500 cP. The viscosity of copolymers, resins, binder compositions and the like, discussed and described herein, can be determined using a Brookfield Viscometer at a temperature of 25° C. For example, the Brookfield Viscometer can be equipped with a small sample adapter such as a 10 mL adapter and the appropriate spindle to maximize torque such as a spindle no. 18.

The first copolymer can be reacted with the one or more base compounds at a temperature ranging from a low of about 40° C., about 70° C., or about 90° C. to a high of about 100° C., about 125° C., or about 150° C. The first copolymer can be reacted with the one or more base compounds under a pressure ranging from a low of about 50 kPa, about 75 kPa, or about 101 kPa to a high of about 150 kPa, about 300 kPa, or about 500 kPa. The first copolymer can be reacted with the one or more base compounds for a time ranging from a low of about 30 minutes, about 45 minutes, or about 1 hour to a high of about 4 hours, about 6 hours, or about 10 hours. In at least one example, the first copolymer can be reacted with the one or more base compounds at a temperature ranging from about 85° C. to about 115° C., at atmospheric pressure, and for a time ranging from about 3 hours to about 7 hours.

The first copolymer and/or the one or more base compounds can be combined and reacted with one another alone or in the presence of a liquid medium. The liquid medium can be or include one or more polar aprotic solvents, one or more polar protic solvents, or any combination thereof. Illustrative polar aprotic solvents can include, but are not limited to, tetrahydrofuran ("THF"), dimethyl sulfoxide ("DMSO"), N-methylpyrrolidone ("NMP"), dimethyl acetamide, acetone, or any combination thereof. Illustrative polar protic solvents can include, but are not limited to, water, methanol, ethanol, propanol, butanol, or any combination thereof. Other liquid mediums can include ketones such as methyl ethyl ketone. The water can be fresh water or process water. A suitable process water can include, for example, an aqueous solution ("white water") of polyacrylamide ("PAA"), amine oxide ("AO"), hydroxyethylcellulose ("HEC"), or any combination thereof. The liquid medium, if present, can be added before, during, and/or after the first copolymer is reacted with the one or more base compounds. For example, the first copolymer can be reacted with an aqueous base compound, e.g., ammonia and/or sodium hydroxide, and after reaction additional liquid medium which can be the same or different, e.g., ammonia or methanol, can then be added to the binder composition.

The amount of the liquid medium combined with the first copolymer and the one or more base compounds and/or the binder composition, e.g., first copolymer modified by reaction with the one or more base compounds, can be sufficient to produce a binder composition having a solids concentration ranging from about 0.1 wt % to about 75 wt %, based on a total weight of the binder composition. As used herein, the solids content of the binder composition the first copolymer, and the like, as understood by those skilled in the art, can be measured by determining the weight loss upon heating a small sample, e.g., 1-5 grams of the binder composition, to a suitable temperature, e.g., 125° C., and a time sufficient to remove the liquid. By measuring the weight of the sample before and after heating, the percent solids in the sample can be directly calculated or otherwise estimated. For example, the amount of liquid medium combined with the first copolymer and the one or more base compounds and/or the first copolymer modified by reaction with the one or more base compounds can be sufficient to produce a binder composition having a solids concentration ranging from a low of about 1 wt %, about 5 wt %, about 10 wt % or about 15 wt % or about 20 wt % to a high of about 30 wt %, about 40 wt %, about 50 wt %, about 60 wt %, about 70 wt %, or about 75 wt %, based on the total weight of the binder composition. In at least one example, a sufficient amount of water, e.g. fresh water or process water, can be combined with the first copolymer and the one or more base compounds to provide a binder composition having a solids concentration ranging from about 1 wt % about 65 wt %, about 5 wt % to about 40 wt %, about 10 wt % to about 30 wt %, about 15 wt % to about 45 wt %, about 20 wt % to about 60 wt %, about 45 wt % to about 55 wt %, or about 40 wt % to about 60 wt %, based on the total weight of the binder composition.

The first copolymer can be reacted with the one or more base compounds in any device, system, apparatus, or combination of devices, systems, and/or apparatus. For example, first copolymer and the base compound can be mixed, blended, or otherwise combined with one another in a reactor vessel or container and allowed to at least partially react to produce the first copolymer modified by reaction with the base compounds. The reactor vessel or container can include, but is not limited to, mechanical mixing devices such as mixing blades, ejectors, sonic mixers, or combinations thereof. One or more heating jackets, heating coils, internal heating elements, cooling jacks, cooling coils, internal cooling elements, or the like, can be used to adjust or otherwise control the temperature of the reaction mixture. The reactor vessel can be an open vessel or an enclosed vessel.

The first copolymer can be cured or self-cured as a consequence of cross-linking, esterification reactions between pendant carboxyls and hydroxyl groups on the solubilized (hydrolyzed) modified first copolymer chains. The first copolymer can further include one or more polyols to increase the crosslink density of the cured first copolymer. As used herein, the term "polyol" refers to compounds that contain two or more hydroxyl functional groups. Suitable polyols can include, but are not limited to, ethylene glycol, polyglycerol, diethylene glycol, triethylene glycol, polyethylene oxide (hydroxy terminated), glycerol, pentaerythritol, trimethylol propane, diethanolamine, triethanolamine, ethyl diethanolamine, methyl diethanolamine, sorbitol, monosaccharides, such as glucose and fructose, disaccharides, such as sucrose, and higher polysaccharides such as starch and reduced and/or modified starches, dextrin, maltodextrin, polyvinyl alcohols, hydroxyethylcellulose, resorcinol, catechol, pyrogallol, glycollated ureas, and 1,4-cyclohexane diol, lignin, or any combination thereof.

The one or more polyols can be combined with the first copolymer and/or the first copolymer reacted with the one or more base compounds to produce a binder composition containing from about 1 wt % to about 50 wt % polyols, based on the combined weight of the polyols and the first copolymer and/or the first copolymer reacted with the one or more base compounds. For example the one or more polyols can be combined with the first copolymer modified by reaction with the one or more base compounds to produce a binder composition having a concentration of the one or more polyols ranging from a low of about 1 wt %, about 5 wt %, about 10 wt %, or about 15 wt % to a high of about 30 wt %, about 40 wt %, or about 45 wt %, based on the combined weight of the first copolymer modified by reaction with the one or more base compounds and the one or more polyols. In another example, the binder composition can be free from any intentionally added polyol(s).

In one or more embodiments above or elsewhere herein, the binder composition can further include one or more other copolymers or "second" copolymers. The second copolymer can be or include one or more aldehyde based copolymers. Illustrative aldehyde based copolymers can include, but are not limited to, one or more amino-aldehyde copolymers, phenol-aldehyde copolymers, dihydroxybenzene or "resorcinol"-aldehyde copolymers, or any combination thereof. The amino component of the amino-aldehyde copolymers can be or include, but is not limited to, urea, melamine, or a combination thereof. The second copolymer can also be or include one or more acrylic acid based copolymers. As such, the second copolymer can be or include, but is not limited to, one or more aldehyde based copolymers, one or more acrylic acid based copolymers, or any combination thereof.

The aldehyde compounds, if present in the second copolymer, can include, but are not limited to, unsubstituted aldehyde compounds and/or substituted aldehyde compounds. For example, suitable aldehyde compounds can be represented by the formula RCHO, wherein R is hydrogen or a hydrocarbon radical. Illustrative hydrocarbon radicals can include from 1 to about 8 carbon atoms. In another example, suitable aldehyde compounds can also include the so-called masked aldehydes or aldehyde equivalents, such as acetals or hemiacetals. Illustrative aldehyde compounds can include, but are not limited to, formaldehyde, paraformaldehyde, acetaldehyde, propionaldehyde, butyraldehyde, furfuraldehyde, benzaldehyde, or any combination thereof. One or more other aldehydes, such as glyoxal can be used in place of or in combination with formaldehyde and/or other aldehydes. In at least one example, the aldehyde compound can include formaldehyde, UFC, or a combination thereof.

Aldehyde compounds for making suitable urea-aldehyde, phenol-aldehyde, melamine-aldehyde, and resorcinol-aldehyde copolymers can be used in many forms such as solid, liquid, and/or gas. Considering formaldehyde in particular, the formaldehyde can be or include paraform (solid, polymerized formaldehyde), formalin solutions (aqueous solutions of formaldehyde, sometimes with methanol, in 37 percent, 44 percent, or 50 percent formaldehyde concentrations), Urea-Formaldehyde Concentrate ("UFC"), and/or formaldehyde gas in lieu of or in addition to other forms of formaldehyde can also be used. In another example, the aldehyde can be or include a pre-reacted urea-formaldehyde mixture having a urea to formaldehyde weight ratio of about 1:2 to about 1:3.

Suitable urea-formaldehyde polymers that can be used as the second copolymer can be prepared from urea and formaldehyde monomers or from urea-formaldehyde precondensates in manners well known to those skilled in the art. Similarly, melamine-formaldehyde, phenol-formaldehyde, and resorcinol-formaldehyde polymers can be prepared from melamine, phenol, and resorcinol monomers, respectively, and formaldehyde monomers or from melamine-formaldehyde, phenol-formaldehyde, and resorcinol-formaldehyde precondensates. Urea, phenol, melamine, resorcinol, and formaldehyde reactants are commercially available in many forms and any form that can react with the other reactants and does not introduce extraneous moieties deleterious to the desired reaction and reaction product can be used in the preparation of the second copolymer. One particularly useful class of urea-formaldehyde polymers can be as discussed and described in U.S. Pat. No. 5,362,842.

Similar to formaldehyde, urea, phenol, resorcinol, and melamine are available in many forms. For example, with regard to urea, solid urea, such as prill and urea solutions, typically aqueous solutions, are commonly available. Further, urea may be combined with another moiety, most typically formaldehyde and urea-formaldehyde adducts, often in aqueous solution. Any form of urea or urea in combination with formaldehyde can be used to make a urea-formaldehyde polymer. Both urea prill and combined urea-formaldehyde products are preferred, such as UFC. These types of products can be as discussed and described in U.S. Pat. Nos. 5,362,842 and 5,389,716, for example.

Many suitable urea-formaldehyde polymers are commercially available. Urea-formaldehyde polymers such as the types sold by Georgia-Pacific Chemicals LLC. (e.g., GP®-2928 and GP®-2980) for glass fiber mat applications, those sold by Hexion Specialty Chemicals, and by Arclin Company can be used. Suitable phenol-formaldehyde resins and melamine-formaldehyde resins can include those sold by Georgia Pacific Resins, Inc. (e.g., GP®-2894 and GP®-4878, respectively). These polymers are prepared in accordance with well known methods and contain reactive methylol groups which upon curing form methylene or ether linkages. Such methylol-containing adducts may include N,N'dimethylol, dihydroxymethylolethylene; N,N' bis(methoxymethyl), N,N'-dimethylolpropylene; 5,5-dimethyl-N,N' dimethylolethylene; N,N'-dimethylolethylene; and the like.

Urea-formaldehyde polymers can include from about 45% to about 70%, and preferably, from about 55% to about 65% solids, generally have a viscosity of about 50 cP to about 600 cP, preferably about 150 to about 400 cP, normally exhibit a pH of about 7 to about 9, preferably about 7.5 to about 8.5, and often have a free formaldehyde level of not more than about 3.0%, and a water dilutability of about 1:1 to about 100:1, preferably about 5:1 and above.

Melamine, if present in the second copolymer, can also be provided in many forms. For example, solid melamine, such as prill and/or melamine solutions can be used. Although melamine is specifically referred to, the melamine can be totally or partially replaced with other aminotriazine compounds. Other suitable aminotriazine compounds can include, but are not limited to, substituted melamines, cycloaliphatic guanamines, or combinations thereof. Substituted melamines include the alkyl melamines and aryl melamines that can be mono-, di-, or tri-substituted. In the alkyl substituted melamines, each alkyl group can contain 1-6 carbon atoms and, preferably 1-4 carbon atoms. Illustrative examples of the alkyl-substituted melamines can include, but are not limited to, monomethyl melamine, dimethyl melamine, trimethyl melamine, monoethyl melamine, and 1-methyl-3-propyl-5-butyl melamine. In the aryl-substituted melamines, each aryl group can contain 1-2 phenyl radicals and, preferably, one phenyl radical. Illustrative examples of aryl-substituted melamines can include, but are not limited to, monophenyl melamine and diphenyl melamine. Any of the cycloaliphatic guanamines can also be used. Suitable cycloaliphatic guanamines can include those having 15 or less carbon atoms. Illustrative cycloaliphatic guanamines can include, but are not limited to, tetrahydrobenzoguanamine, hexahydrobenzoguanamine, 3-methyl-tetrahydrobenzoguanamine, 3-methylhexahydrobenzoguanamine, 3,4-dimethyl-1,2,5,6-tetrahydrobenzoguanamine, and 3,4-dimethylhexahydrobenzoguanamine and mixtures thereof. Mixtures of aminotriazine compounds can include, for example, melamine and an alkyl-substituted melamine, such as dimethyl melamine, or melamine and a cycloaliphatic guanamine, such as tetrahydrobenzoguanamine.

The phenol component, if present in the second copolymer, can include a variety of substituted phenolic compounds, unsubstituted phenolic compounds, or any combination of substituted and/or unsubstituted phenolic compounds. For example, the phenol component can be phenol itself (i.e., mono-hydroxy benzene). Examples of substituted phenols can include, but are not limited to, alkyl-substituted phenols such as the cresols and xylenols; cycloalkyl-substituted phenols such as cyclohexyl phenol; alkenyl-substituted phenols; aryl-substituted phenols such as p-phenyl phenol; alkoxy-substituted phenols such as 3,5-dimethyoxyphenol; aryloxy phenols such as p-phenoxy phenol; and halogen-substituted phenols such as p-chlorophenol. Dihydric phenols such as catechol, resorcinol, hydroquinone, bisphenol A and bisphenol F also can also be used. In particular, the phenol component can be selected from the group consisting of phenol; alkyl-substituted phenols such as the cresols and xylenols; cycloalkyl-substituted phenols such as cyclohexyl phenol; alkenyl-substituted phenols; aryl-substituted phenols such as p-phenyl phenol; alkoxy-substituted phenols such as 3,5-dimethyoxyphenol; aryloxy phenols such as p-phenoxy phenol; halogen-substituted phenols such as p-chlorophenol; catechol, hydroquinone, bisphenol A and bisphenol F. Preferably, about 95 wt % or more of the phenol component comprises phenol (monohydroxybenzene).

The resorcinol component, if present in the second copolymer, can be provided in a variety of forms. For example, the resorcinol component can be provided as a white/off-white solid or flake and/or the resorcinol component can be heated and supplied as a liquid. Any form of the resorcinol can be used with any form of the aldehyde component to make the resorcinol-aldehyde copolymer. The resorcinol component can be resorcinol itself (i.e., Benzene-1,3-diol). Suitable resorcinol compounds can also be described as substituted phenols. The solids component of a liquid resorcinol-formaldehyde copolymer can range from about 45 wt % to about 75 wt %. Liquid resorcinol-formaldehyde copolymers can have a Brookfield viscosity at 25° C. that varies widely, e.g., from about 200 cP to about 20,000 cP. Liquid resorcinol copolymers typically have a dark amber color.

Illustrative acrylic acid based copolymers can include, but are not limited to, copolymers of acrylic acid and one or more unsaturated carboxylic acid monomers, copolymers of acrylic acid and one or more hydroxyl containing unsaturated monomers, copolymers of acrylic acid and one or more vinyl derived units, or any combination thereof. Suitable unsaturated carboxylic acid monomers can include, but are not limited to, aconitic acid, itaconic acid, maleic acid, methacrylic acid, an adduct (ester) of citric acid and maleic acid, crotonic acid, isocrotonic acid, citraconic acid, fumaric acid, or any combination thereof. Other suitable unsaturated carboxylic acid monomers can include compounds that are capable of presenting carboxylic moieties during the subsequent curing reaction such as maleic anhydride. Suitable hydroxyl containing unsaturated monomers can include, but are not limited to, allyl lactate, hydroxyethyl acrylate and hydroxyethyl methacrylate (hereinafter identified together as hydroxyethyl (meth)acrylate), hydroxypropyl(meth)acrylate, and hydroxyalkyl allyl ethers such as 2-allyloxy ethanol, and the like. The unsaturated hydroxyl monomer can also include compounds that are capable of presenting hydroxyl moieties during the subsequent curing reaction such as vinyl acetate (vinyl alcohol), glycidyl (meth)acrylate, allyl glycidyl ether, and allyl glycidol. Suitable vinyl derived units can include, but are not limited to, styrene, alpha methyl styrene, methyl acrylate, methyl(meth)acrylate, ethyl acrylate, methyl ethyl acrylate, butyl acrylate, or any combination thereof.

Illustrative second copolymers can include, but are not limited to, urea-formaldehyde ("UF"), phenol-formaldehyde ("PF"), melamine-formaldehyde ("MF"), resorcinol-formaldehyde ("RF"), styrene-acrylic acid; acrylic acid maleic acid copolymer, or any combination thereof. Combinations of amino-aldehyde copolymers can include, for example, melamine-urea-formaldehyde ("MUF"), phenol-urea-formaldehyde ("PUF"), phenol-melamine-formaldehyde ("PMF"), phenol-resorcinol-formaldehyde ("PRF"), and the like. As such, the term "second copolymer," as used herein, can be or include polymers derived from two or more monomers. In another example, the second copolymer can include a combination of an amino-aldehyde copolymer and/or a phenol-aldehyde copolymer and a polyacrylic acid, for example, urea-formaldehyde-polyacrylic acid, melamine-formaldehyde-polyacrylic acid, phenol-formaldehyde-polyacrylic acid, and the like.

In one or more embodiments, the second copolymer can be present in the binder composition in an amount ranging from about 1 wt % to about 99 wt %, based on the total weight of the first copolymer and the second copolymer. For example, the second copolymer can be present in an amount ranging from a low of about 5 wt %, about 15 wt %, about 25 wt %, or about 35 wt % to a high of about 65 wt %, about 75 wt %, about 85 wt %, or about 95 wt %, based on the total weight of the first copolymer and the second copolymer. When two or more polymers are combined to provide the second copolymer, the two or more polymers can be present in any amount. For example, a second copolymer containing phenol-formaldehyde and urea-formaldehyde can include from about 1 wt % to about 99 wt % of the phenol-formaldehyde and from about 1 wt % to about 99 wt % of the urea-formaldehyde, based on the total weight of the second copolymer.

The solids of the second copolymer can range from 1 wt % to about 80 wt %. For example, the second copolymer can have a solids concentration ranging from a low of about 1 wt %, about 5 wt %, about 10 wt % or about 15 wt % to a high of about 30 wt %, about 40 wt %, about 50 wt %, about 60 wt %, about 70 wt %, or about 75 wt %.

The second copolymer and the first copolymer reacted with the one or more base compounds can be combined with one another to produce another binder composition. Such binder composition can include about 0.1 wt % to about 99.9 wt % of the first copolymer and conversely about 99.9 wt % to about 0.1 wt % of the second copolymer. For example, the first copolymer can be present in an amount ranging from a low of about 1 wt %, about 5 wt %, about 10 wt %, about 15 wt %, about 20 wt %, about 25 wt % about 30 wt %, about 35 wt %, about 40 wt %, or about 45 wt % to a high of about 60 wt %, about 65 wt %, about 70 wt %, about 75 wt %, about 80 wt %, about 85 wt %, about 90 wt %, about 95 wt %, or about 99 wt %, based on the combined weight of the first and second copolymer. In another example, the second copolymer can be present in the binder composition in an amount ranging from a low of about 1 wt %, about 5 wt %, about 10 wt %, about 15 wt %, about 20 wt %, about 25 wt % about 30 wt %, about 35 wt %, about 40 wt %, or about 45 wt % to a high of about 60 wt %, about 65 wt %, about 70 wt %, about 75 wt %, about 80 wt %, about 85 wt %, about 90 wt %, about 95 wt %, or about 99 wt %, based on the combined weight of the first and second copolymer. In another example, the binder composition can include about 1 wt % to about 99 wt %, or about 1 wt % to about 15 wt %, or about 15 wt % to about 35 wt %, or about 35 wt % to about 65 wt %, or about 65 wt % about 95 wt %, or about 85 wt % to about 99 wt %, or about 45 wt % to about 55 wt % of the first copolymer, based on the combined weight of the first and second copolymers. In another example, the binder composition can include about 5 wt % first copolymer and about 95 wt % second copolymer, or about 10 wt % first copolymer and about 90 wt % second copolymer, or about 20 wt % first copolymer and about 80 wt % second copolymer, or about 25 wt % first copolymer and about 75 wt % second copolymer, or about 30 wt % first copolymer and about 70 wt % second copolymer, or about 40 wt % first copolymer and about 60 wt % second copolymer, or about 50 wt % first copolymer and about 50 wt % second copolymer, or about 60 wt % first copolymer and about 40 wt % second copolymer, or about 70 wt % first copolymer and about 30 wt % second copolymer, or about 75 wt % first copolymer and about 25 wt % second copolymer, or about 80 wt % first copolymer and about 20 wt % second copolymer, or about 90 wt % first copolymer and about 10 wt % second copolymer, or about 95 wt % first copolymer and about 5 wt % second copolymer, based on the combined weight of the first and second copolymers.

The binder composition that includes the first and second copolymers can have a pH ranging from a low of about 4, about 4.5, about 5, or about 5.5 to a high of about 7, about 8, about 9, or about 10. For example, the binder composition that includes the first and second copolymers can have a pH of about 5 to about 7, about 5.5 to about 6.5, or about 5.7 to about 6.3. The binder composition that includes the first and second copolymers can have a viscosity ranging from a low of about 50 cP, about 100 cP, about 200, cP, about 300 cP, about 500 cP, about 750 cP, or about 900 cP to a high of about 1,100 cP, about 1,300 cP, about 1,500 cP, about 1,700 cP, about 2,000 cP, about 2,250 cP, or about 2,500 cP.

The binder composition that includes the first copolymer modified by reaction with the one or more base compounds and the second copolymer can be mixed or combined with a liquid medium. The liquid medium can be as discussed and described above. The binder composition that includes the first and second copolymers can have a solids concentration ranging from about 0.1 wt % to about 75 wt %, based on the total weight of the binder composition. For example, the amount of liquid medium combined with the first copolymer and the second copolymer can be sufficient to produce a binder composition having a solids concentration ranging from a low of about 1 wt %, about 5 wt %, about 10 wt % or about 15 wt % or about 20 wt % to a high of about 30 wt %, about 40 wt %, about 50 wt %, about 60 wt %, about 70 wt %, or about 75 wt %, based on a total weight of the binder composition. In at least one example, a sufficient amount of water, e.g. fresh water or process water, can be combined with the first copolymer and second copolymer to provide a binder composition having a solids concentration ranging from about 1 wt % about 65 wt %, about 5 wt % to a bout 40 wt %, about 10 wt % to about 30 wt %, about 15 wt % to about 45 wt %, about 20 wt % to about 60 wt %, about 45 wt % to about 55 wt %, or about 40 wt % to about 60 wt %, based on the total weight of the binder composition.

In one or more embodiments above or elsewhere herein, the binder composition can include one or more carbohydrates, one or more polyols, or any combination thereof. Suitable polyols can be as discussed and described above. As used therein, the term "carbohydrate" refers to compounds having the formula $C_m(H_2O)_n$; that is, compounds that include carbon, hydrogen and oxygen, with a hydrogen to oxygen (H:O) atom ratio of 2:1. Structurally, the term "carbohydrate" refers to polyhydroxy aldehydes and polyhydroxy ketones. The one or more carbohydrates can include one or more monosaccharides, disaccharides, oligosaccharides, polysaccharides, or any combinations thereof. In one or more embodiments, the one or more carbohydrates can include one or more aldose sugars. In one or more embodiments, the monosaccharide can be or include D-Glucose (dextrose monohydrate), L-Glucose, or a combination thereof. Other carbohydrate aldose sugars can include, but are not limited to, glyceraldehyde, erythrose, threose, ribose, deoxyribose, arabinose, xylose, lyxose, allose, altrose, gulose, mannose, idose, galactose, talose, and any combination thereof. The carbohydrate can also be or include one or more reduced or modified starches such as dextrin, maltodextrin, and oxidized maltodextrins.

The one or more carbohydrates and/or polyols can be present in an amount ranging from a low of about 1 wt %, about 3 wt %, or about 5 wt % to a high of about 70 wt %, about 80 wt %, or about 90 wt %, based on the total weight of the binder composition. In one or more embodiment, the binder composition can include from about 5 wt % to about 50 wt % carbohydrates and/or polyols, based on the total weight of the binder composition. In one or more embodiments, the binder composition can include from about 7.5 wt % to about 15 wt % carbohydrates and/or polyols, based on the total weight of the binder composition. In one or more embodiments, the binder composition can include from about 5 wt % to about 30 wt % carbohydrates and/or polyols, based on the total weight of the binder composition.

When the one or more carbohydrates and/or polyols, the second copolymer, and the first copolymer are present in the binder composition, the combined amount of the carbohydrates and/or polyols and second copolymer can range from a low of about 1 wt %, about 5 wt %, or about 10 wt % to a high of about 80 wt %, about 90 wt %, or about 99 wt %, based on the weight of the binder composition. For example, the binder composition can include from about 10 wt % to about 90 wt % of the first copolymer and from about 10 wt % to about 90 wt % combined carbohydrates and/or polyols and the second copolymer. The amount of the carbohydrates and/or polyols can range from about 1 wt % to about 99 wt % and the amount of the second copolymer can range from about 1 wt % to about 99 wt %, based on the combined weight of the carbohydrates and/or polyols and the second copolymer. In at least one specific embodiment, the binder composition can include from about 10 wt % to about 29 wt % of the first copolymer; about 1 wt % to about 98 wt % carbohydrates and/or polyols; and about 1 wt % to about 98 wt % second copolymer, based on the combined weight of the first copolymer, the carbohydrates and/or polyols, and the second copolymer. In another example, the binder composition can include from about 0.1 wt % to about 99.9 wt % of the first copolymer, from about 0.1 wt % to about 99.9 wt % of the second copolymer, and from about 1 wt % to about 60 wt % of the carbohydrates and/or polyols, based on the combined weight of the first copolymer, the second copolymer, and the carbohydrates and/or polyols. In another example, the binder composition can include from about 70 wt % to about 90 wt % of the first copolymer, from about 10 wt % to about 30 wt % of the second copolymer, and from about 1 wt % to about 50 wt % of the carbohydrates and/or polyols, based on the combined weight of the first copolymer, the second copolymer, and the carbohydrates and/or polyols. In another example, the binder composition can include from about 10 wt % to about 30 wt % of the first copolymer, from about 70 wt % to about 90 wt % of the second copolymer, and from about 1 wt % to about 50 wt % of the carbohydrates and/or polyols, based on the combined weight of the first copolymer, the second copolymer, and the carbohydrates and/or polyols. In another example, the binder composition can include from about 40 wt % to about 60 wt % of the first copolymer, from about 40 wt % to about 60 wt % of the second copolymer, and from about 1 wt % to about 50 wt % of the carbohydrates and/or polyols, based on the combined weight of the first copolymer, the second copolymer, and the carbohydrates and/or polyols.

In at least one specific embodiment, the binder composition can include a copolymer of maleic anhydride and one or more vinyl aromatic derived units, and one or more amines. Such binder composition can include about 99.5 mol % to about 99.99 mol % copolymer and about 0.01 mol % to about 0.5 mol % amine(s), based on the combined weight of the copolymer and amine(s). For example, the amine(s) can be present in an amount ranging from a low of about 0.01 mol %, about 0.1 mol %, or about 0.2 mol % to a high of about 0.3 mol %, about 0.35 mol %, or about 0.4 mol %, based on the combined weight of the copolymer and amine(s). In one or more embodiments, the binder composition can include less than about 15 wt %, less than about 10 wt %, less than about 7 wt %, less than about 5 wt %, less than about 3 wt %, less than about 1 wt %, or less than about 0.5 wt % monoethanolamine, based on the combined weight of the amines in the binder composition. For example, the binder composition can include about 14 wt % monoethanolamine and about 86 wt % triethanolamine or other amine(s), based on the total weight of the amines in the binder composition.

In at least one specific embodiment, the binder composition can include the first copolymer, e.g., a copolymer of maleic anhydride and one or more vinyl aromatic derived units and one or more amines, and the second copolymer. Such binder composition can include about 1 wt % to about 99 wt % of the first copolymer, about 0.05 wt % to about 0.5 wt % of the amine(s), and about 1 wt % to about 99 wt % of the second copolymer, based on the combined weight of the first copolymer, amine(s), and second copolymer. For example, the first copolymer can be present in an amount ranging from a low of about 10 wt %, about 20 wt %, about 30 wt %, or about 40 wt % to a high of about 60 wt %, about 70 wt %, about 80 wt %, or about 90 wt %, based on the combined weight of the first copolymer, amine(s), and second copolymer. The one or more amines can be present in an amount ranging from a low of about 0.1 wt %, about 0.15 wt %, or about 0.2 wt % to a high of about 0.3 wt %, about 0.35 wt %, or about 0.4 wt %, based on the combined weight of the first copolymer, amine(s), and second copolymer. The second copolymer can be present in an amount ranging from a low of about 10 wt %, about 20 wt %, about 30 wt %, or about 40 wt % to a high of about 60 wt %, about 70 wt %, about 80 wt %, or about 90 wt %, based on the combined weight of the first copolymer, amine(s), and second copolymer.

In at least one specific embodiment, the binder composition can include the first copolymer, e.g., a copolymer of maleic anhydride and one or more vinyl aromatic derived units and one or more amines, and one or more carbohydrates and/or polyols. Such binder composition can include about 1 wt % to about 99 wt % of the first copolymer, about 0.05 wt % to about 0.5 wt % of the amine(s), and about 1 wt % to about 99 wt % of the carbohydrates and/or polyols, based on the combined weight of the first copolymer, amine(s), and carbohydrates and/or polyols. For example, the first copolymer can be present in an amount ranging from a low of about 10 wt %, about 20 wt %, about 30 wt %, or about 40 wt % to a high of about 60 wt %, about 70 wt %, about 80 wt %, or about 90 wt %, based on the combined weight of the first copolymer, amine(s), and carbohydrates and/or polyols. The one or more amines can be present in an amount ranging from a low of about 0.1 wt %, about 0.15 wt %, or about 0.2 wt % to a high of about 0.3 wt %, about 0.35 wt %, or about 0.4 wt %, based on the combined weight of the first copolymer, amine(s), and carbohydrates and/or polyols. The carbohydrate(s) can be present in an amount ranging from a low of about 10 wt %, about 20 wt %, about 30 wt %, or about 40 wt % to a high of about 60 wt %, about 70 wt %, about 80 wt %, or about 90 wt %, based on the combined weight of the first copolymer, amine(s), and carbohydrates and/or polyols. The polyols can be present in an amount ranging from a low of about 10 wt %, about 20 wt %, about 30 wt %, or about 40 wt % to a high of about 60 wt %, about 70 wt %, about 80 wt %, or about 90 wt %, based on the combined weight of the first copolymer, amine(s), and carbohydrate(s) and/or polyol(s).

In at least one specific embodiment, the binder composition can include the first copolymer, e.g., a copolymer of maleic anhydride and one or more vinyl aromatic derived units and one or more amines, and one or more carbohydrates and/or polyols, and the second copolymer. Such binder composition can include about 1 wt % to about 98 wt % of the first copolymer, about 0.05 wt % to about 0.5 wt % of the amine(s), about 1 wt % to about 98 wt % of the carbohydrate(s) and/or polyol(s), and about 1 wt % to about 98 wt % of the second copolymer, based on the combined weight of the first copolymer, amine(s), carbohydrate(s) and/or polyol(s), and second copolymer. For example, the first copolymer can be present in an amount ranging from a low of about 10 wt %, about 20 wt %, or about 30 wt %, or about 40 wt % to a high of about 60 wt %, about 70 wt %, about 80 wt %, or about 90 wt %, based on the combined weight of the first copolymer, amine(s), carbohydrate(s) and/or polyol(s), and second copolymer. The one or more amines can be present in an amount ranging from a low of about 0.1 wt %, about 0.15 wt %, or about 0.2 wt % to a high of about 0.3 wt %, about 0.35 wt %, or about 0.4 wt %, based on the combined weight of the first copolymer, amine(s), carbohydrate(s) and/or polyol(s), and second copolymer. The one or more carbohydrates can be present in an amount ranging from a low of about 10 wt %, about 20 wt %, about 30 wt %, or about 40 wt % to a high of about 60 wt %, about 70 wt %, about 80 wt %, or about 90 wt %, based on the combined weight of the first copolymer, amine(s), carbohydrate(s) and/or polyol(s), and second copolymer. The one or more polyols can be present in an amount ranging from a low of about 10 wt %, about 20 wt %, about 30 wt %, or about 40 wt % to a high of about 60 wt %, about 70 wt %, about 80 wt %, or about 90 wt %, based on the combined weight of the first copolymer, amine(s), carbohydrate(s) and/or polyol(s), and second copolymer. The second copolymer can be present in an amount ranging from a low of about 10 wt %, about 20 wt %, about 30 wt %, or about 40 wt % to a high of about 60 wt %, about 70 wt %, about 80 wt %, or about 90 wt %, based on the combined weight of the first copolymer, amine(s), carbohydrate(s) and/or polyol(s), and second copolymer.

In at least one specific embodiment, the binder composition can include one or more carbohydrates and/or polyols and the second copolymer. Such binder composition can include about 1 wt % to about 99 wt % of the one or more carbohydrates and/or polyols and from about 1 wt % to about 99 wt % of the second copolymer, based on the combined weight of the carbohydrates and/or polyols and the second copolymers. For example, the one or more carbohydrates can be present in an amount ranging from a low of about 3 wt %, about 5 wt %, or about 10 wt % to a high of about 25 wt %, about 35 wt %, or about 45 wt %, based on the combined weight of the carbohydrates and/or polyols and the second copolymer. In another example, the one or more polyols can be present in an amount ranging from a low of about 3 wt %, about 5 wt %, or about 10 wt % to a high of about 25 wt %, about 35 wt %, or about 45 wt %, based on the combined weight of the carbohydrates and/or polyols and the second copolymer. The second copolymer can be present in an amount ranging from a low of about 55 wt %, about 65 wt %, or about 75 wt % to a high of about 90 wt %, about 95 wt %, or about 97 wt %, based on the combined weight of the carbohydrates and/or polyols and the second copolymer.

In at least one specific embodiment, the binder composition can be a no-added formaldehyde. As used herein, the term "no-added formaldehyde" refers to a binder composition that does not include intentionally added formaldehyde. In order to minimize the formaldehyde content of the composition additives that do not contain formaldehyde and/or do not generate formaldehyde during drying and/or curing can be used. The term "no-added formaldehyde" can also refer to a binder composition formulated with no added formaldehyde as part of the resin cross linking structure that meets the performance standard defined in Section 93120.3 of the California Air Resources Board ("CARB") Air Toxic Control Measure ("ATCM"). Illustrative no-added formaldehyde binder compositions can include, but are not limited to, binders made from soy, polyvinyl acetate, or methylene diisocyanate.

The binder composition can be applied as a dilute aqueous solution to a plurality of fibers and at least partially cured to produce a fiber product, e.g., a fiberglass mat. The binder composition can be applied as a dilute aqueous solution to a plurality of fibers and cured, e.g., fully cured, to produce a fiber product, e.g., a fiberglass mat. In at least one embodiment, the aqueous solution can have a pH ranging from about 3 to about 12. For example, the pH can range from a low of about 4, 5, 6, or 7 to a high of about 8, 9, 10, or 11. In another example, the aqueous solution can have a pH of about 5 or more, about 6 or more, about 7 or more, or about 8 or more. The pH of the aqueous solution can be adjusted by adding any suitable base or alkaline compound, e.g., one or more organic bases, inorganic bases, or any combination thereof. Suitable bases or alkaline compounds can include, but are not limited to, hydroxides, carbonates, ammonia, amines, amides, or any combination thereof. Illustrative hydroxides, carbonates, and amines can include those discussed and described above or elsewhere herein.

In one or more embodiments above or elsewhere herein, the binder composition can be cured or crosslinked via an esterification reaction between pendant carboxyl groups of the first copolymers (e.g., SMA copolymer) and when optional polyol(s) is added both pendant hydroxyl groups of the first copolymers (e.g., SMA copolymer) and hydroxyl groups of the polyol(s). Additional crosslinking may occur with any additional polyol that may optionally be added to the composition. A thermal process or heat can also be used to cure the binder composition. For example, an oven or other heating device can be used to cure the binder composition.

As used herein, the terms "curing," "cured," and similar terms are intended to embrace the structural and/or morphological change that occurs in a binder composition, such as by covalent chemical reaction (crosslinking), ionic interaction or clustering, improved adhesion to the substrate, phase transformation or inversion, and/or hydrogen bonding when the binder composition is dried and heated to cause the properties of a flexible, porous substrate, such as a mat or blanket of fibers, especially glass fibers, to which an effective amount of the binder composition has been applied, to be altered.

As used herein, the term "cured binder" refers to the cured product of the binder composition, e.g., the first copolymer and any added polyol, such that the cured product bonds the fibers of a fibrous product together. As used here, the term "cured binder" also refers to the cured product of the first copolymer, e.g., maleic anhydride and the one or more vinyl aromatic derived units that is modified with one or more carbohydrates and any added polyol, such that the cured product bonds the fibers of a fibrous product together. Generally, the bonding occurs at the intersection of overlapping fibers.

As used herein, the terms "fiber," "fibrous," "fiberglass," "fiber glass," "glass fibers," and the like are refer to materials that have an elongated morphology exhibiting an aspect ratio (length to thickness) of greater than 100, generally greater than 500, and often greater than 1000. Indeed, an aspect ratio of over 10,000 is possible. Suitable fibers can be glass fibers, natural fibers, synthetic fibers, mineral fibers, ceramic fibers, metal fibers, carbon fibers, or any combination thereof. Illustrative glass fibers can include, but are not limited to, A-type glass fibers, C-type glass fibers, E-type glass fibers, S-type glass fibers, ECR-type glass fibers, wool glass fibers, and any combination thereof. The term "natural fibers," as used herein refers to plant fibers extracted from any part of a plant, including, but not limited to, the stem, seeds, leaves, roots, or phloem. Illustrative natural fibers can include, but are not limited to, cotton, jute, bamboo, ramie, bagasse, hemp, coir, linen, kenaf, sisal, flax, henequen, and any combination thereof. Illustrative synthetic fibers can include, but are not limited to, synthetic polymers, such as polyester, polyamide, aramid, and any combination thereof. In at least one specific embodiment, the fibers can be glass fibers that are wet use chopped strand glass fibers ("WUCS"). Wet use chopped strand glass fibers can be formed by conventional processes known in the art. The WUCS can have a moisture content ranging from a low of about 5%, about 8%, or about 10% to a high of about 20%, about 25%, or about 30%.

Prior to using the fibers to make a fiberglass product, the fibers can be allowed to age for a period of time. For example, the fibers can be aged for a period of a few hours to several weeks before being used to make a fiberglass product. For fiberglass mat products the fibers can typically be aged for about 3 to about 30 days. Ageing the fibers includes simply storing the fibers at room temperature for the desired amount of time prior to being used in making a fiberglass product.

In one or more embodiments, a method for binding loosely associated, non-woven mat or blanket of fibers can include, but is not limited to (1) contacting the fibers with the binder composition and (2) heating the curable binder composition to an elevated temperature, which temperature is sufficient to at least partially cure the binder composition. Preferably, the binder composition is cured at a temperature ranging from about 75° C. to about 300° C., usually at a temperature between about 100° C. and up to a temperature of about 250° C. The binder composition can be cured at an elevated temperature for a time ranging from about 1 second to about 15 minutes. The particular curing time can depend, at least in part, on the type of oven or other heating device design and/or production or line speed.

In preparing the binder composition, the first copolymer, e.g., maleic anhydride and one or more vinyl aromatic derived units, can be initially modified by reaction with one or more amines, for example an alkanolamine. The modification can be accomplished by mixing the first copolymer, which usually is supplied in flake or powder form, with the amine(s). The amine-modified copolymer can then be diluted with water. Usually, the modification is accomplished by mixing the first copolymer with an aqueous solution of the amine(s). Alternatively, initial mixing of the first copolymer and amine(s) can be in the absence of water (neat) with subsequent addition of water and optionally additional amine(s).

The amine(s) can be provided in an amount relative to the first copolymer, sufficient to provide at least 0.05 moles of amine moiety per mole of the one or more unsaturated carboxylic acids and/or the one or more unsaturated carboxylic anhydrides in the first copolymer. For example, the amine(s) can be present in an amount, relative to the first copolymer, to provide at least 0.1, or 0.3, or 0.5, or 0.7, or 0.9, or 1.1, or 1.3, or 1.5, or 1.7, or 1.9 moles of amine moiety per mole of the one or more unsaturated carboxylic acids and/or the one or more unsaturated carboxylic anhydrides in the first copolymer. In one or more embodiments, the amount of amine moieties can be less than about 2 moles of amine moieties for each mole of the one or more unsaturated carboxylic acids and/or the one or more unsaturated carboxylic anhydrides in the first copolymer or less than about 1 mole of amine moieties for each mole of the one or more unsaturated carboxylic acids and/or one or more unsaturated carboxylic anhydrides. In one or more embodiments, the amine(s) can be present in an amount relative to the first copolymer, sufficient to provide between about 0.05 mole to about 0.4 mole of amine moiety per mole of the one or more unsaturated carboxylic acids and/or one or more unsaturated carboxylic anhydrides in the copolymer.

While an aqueous-based reaction between the first copolymer and the amine(s) can occur at an ambient temperature, usually to minimize the duration of this procedure it is preferred to conduct the reaction at a temperature in the range of about 40° C. to about 125° C. or higher. In order to minimize the amount of water that accompanies the binder composition during shipment and storage, it is preferable to use a concentrated solution of the amine(s) for modifying the first copolymer. In any event, the solution of the amine(s) used for preparing the binder composition will usually contain between about 10 and about 99.9 weight % of the amine(s).

Initially on mixing the first copolymer with the amine(s) a reaction between the one or more unsaturated carboxylic acids and/or the one or more unsaturated carboxylic anhydrides of the first copolymer and the amine group of alkanolamines and/or monoethanol amides, for example, results is the formation of a hydroxyl terminated amide group and a free carboxyl group. Some of these adjacent groups may also react to form a hydroxyl-terminated imide group. Formation of the imide is favored under normal heating conditions in the range from about 70° C. to about 200° C. Imide formation may be advantageous as it provides a copolymer with additional hydrophobicity that may further augment the wet tensile strength properties of fiber products cured with the binder composition.

The binder composition can have a pH of about 5 or more, about 7 or more, and still about 9 or more. In order to increase the pH of the binder composition one or more bases or "base compounds" can be added. A preferred base compound for this purpose can be or include ammonia. Other suitable base compounds can include amines, e.g., primary, secondary, and tertiary amines and polyamines, sodium hydroxide ("NaOH"), potassium hydroxide ("KOH"), and other basic compounds. Furthermore, the addition of, for example, a secondary alkanolamine, a tertiary alkanolamine, and mixtures thereof can also serve as a source of polyols for participating in cross-linking reactions that cause the binder composition to cure. The addition of, for example, one or more polyamines can also increase the cross-linking reactions. Illustrative polyamines can include diethylenetriamine ("DETA"), triethylenetetramine ("TETA"), tetraethylenepentamine ("TEPA"), and any combination thereof.

The amount of polyol in the composition, whether or not supplied in whole or in part by an alkanolamine, should preferably provide a mole ratio of —COOH contributed by the first copolymer (and any other optional polyacid in the composition) to —OH contributed both by the first copolymer and by any additional polyol component (i.e., the —COOH:—OH ratio of the composition) in the range of about 10:1 to about 1:10, most often in the range of about 5:1 to about 1:5 and most usually in the range of about 2:1 to about 1:2. This mole ratio can be determined by calculating the ratio of the number of moles of the modified copolymer multiplied by its average —COOH functionality (plus any other polyacid component) to the sum of the number of moles of the modified copolymer multiplied by its average —OH functionality and the number of moles of the polyol component(s) multiplied by its (their) average functionality. Preferably, the mole ratio of —COOH to —OH in the composition is in the range of about 2:1 to about 1:2 and more preferably in the range of about 1.5:1 to about 1:1.5.

In one or more embodiments, other additives for augmenting the cross-linking of the binder composition can be introduced thereto. For example, urea and polyamino compounds, both synthetic and natural (e.g., protein sources such as soy) can be introduced to the binder composition for augmenting the cross-linking.

As noted above, in the making of non-woven fiber products, such as fiberglass mat, the binder composition can be formulated into a dilute aqueous solution and then applied, such as by a curtain coating, spraying, or dipping, onto fibers, such as glass fibers. The aqueous solution can be fresh water, process water, or a combination thereof. Binder compositions containing somewhere between about 1 wt % and about 50 wt % solids are typically used for making fiber products, including glass fiber products. For example, the aqueous binder composition can have a solids concentration ranging from a low of about 10 wt %, about 13 wt %, about 15 wt %, or about 18 wt % to a high of about 22 wt %, about 26 wt %, about 30 wt %, or about 33 wt %.

The amount of binder composition applied to the fiberglass product, e.g., a fiberglass mat product, can vary considerably. Loadings typically can range from about 3 wt % to about 45 wt %, about 10 wt % to about 40 wt %, or from about 15 wt % to about 30 wt %, of nonvolatile binder composition based on the dry weight of the bonded fiberglass product. For inorganic fibrous mats, the amount of binder composition applied to a fiberglass product can normally be confirmed by measuring the percent loss on ignition ("LOI") of the fiber mat product.

The aqueous solution of the modified copolymer can be blended with other additives or ingredients commonly used in binder compositions for preparing fiber products and diluted with additional water to a desired concentration which is readily applied onto the fibers, such as by a curtain coater. Illustrative additives can include, but are not limited to, dispersants, biocides, viscosity modifiers, pH adjusters, coupling agents, surfactants, lubricants, defoamers, and the like. For example, the binder composition can be added to an aqueous solution ("white water") of polyacrylamide ("PAA"), amine oxide ("AO"), hydroxyethylcellulose ("HEC"), or any combination thereof. In another example, a coupling agent (e.g., a silane coupling agent, such as an organo silicon oil) can also be added to the solution.

The binder composition may be prepared by combining the aqueous solution of the copolymer and the additives in a relatively easy mixing procedure. The mixing procedure can be carried out at ambient temperature or at a temperature greater than ambient temperature, for example about 50° C. The binder composition can be used immediately or stored for a period of time and may be diluted with water to a concentration suitable for the desired method of application, such as by a curtain coater onto the glass fibers.

Fiberglass mats can be manufactured in a wet-laid or dry-laid process. In a wet-laid process, chopped bundles of fibers, having suitable length and diameter, can be introduced to an aqueous dispersant medium to produce an aqueous fiber slurry, known in the art as "white water." The white water can typically contain about 0.5 wt % fibers. The fibers can have a diameter ranging from about 0.5 μm to about 30 μm and a length ranging from about 5 mm to about 50 mm, for example. The fibers can be sized or unsized and wet or dry, as long as the fibers can be suitably dispersed within the aqueous fiber slurry.

The dispersing agent(s) can be present in an amount ranging from about 10 ppm to about 8,000 ppm, about 100 ppm to about 5,000 ppm, or from about 200 ppm to about 1,000 ppm. The introduction of one or more viscosity modifiers can reduce settling time of the fibers and can improve the dispersion of the fibers in the aqueous solution. The amount of viscosity modifier used can be effective to provide the viscosity needed to suspend the fibers in the white water as needed to form the wet laid fiber product. The optional viscosity modifier(s) can be introduced in an amount ranging from a low of about 1 cP, about 1.5 cP, or about 2 cP to a high of about 8 cP, about 12 cP, or about 15 cP (Brookfield Viscometer measured at 25° C.). For example, optional viscosity modifier(s) can be introduced in an amount ranging from about 1 cP to about 12 cP, about 2 cP to about 10 cP, or about 2 cP to about 6 cP. In one or more embodiments, the fiber slurry can include from about 0.03 wt % to about 25 wt % solids. The fiber slurry can be agitated to produce a uniform dispersion of fibers having a suitable consistency.

The fiber slurry, diluted or undiluted, can be introduced to a mat-forming machine that can include a mat forming screen, e.g., a wire screen or sheet of fabric, which can form a fiber product and can allow excess water to drain therefrom, thereby forming a wet or damp fiber mat. The fibers can be collected on the screen in the form of a wet fiber mat and excess water is removed by gravity and/or by vacuum assist. The removal of excess water via vacuum assist can include one or a series of vacuums.

As discussed above, a curable binder composition can be formulated as a liquid and applied onto the dewatered wet fiber mat. Application of the binder composition can be accomplished by any conventional means, such as by soaking the mat in an excess of binder solution or suspension, a falling film or curtain coater, dipping, or the like. The binder composition can include, for example, from about 5 wt % to about 45 wt % solids. Excess binder composition can be removed, for example under vacuum.

The aqueous binder composition, after it is applied to the glass fibers, can be cured. For example, the fiberglass product can be heated to effect final drying and full curing. The duration and temperature of heating can affect the rate of processability and handleability, degree of curing and property development of the treated substrate. The curing temperature can be within the range from about 50° C. to about 300° C., preferably within the range from about 90° C. to about 230° C. and the curing time will usually be somewhere between 1 second to about 15 minutes. In one or more embodiments, the curing temperature can include a temperature gradient ranging from a low of about 25° C. to a high of about 230° C., i.e. the temperature applied during the curing process can vary. In at least one specific embodiment, the curing temperature can range from about 190° C. to about 225° C. and the curing time can range from a low of about 1 second, about 2 seconds, or about 3 seconds to a high of about 9 seconds, about 12 seconds, about 15 seconds, about 20 seconds, about 25 seconds, or about 30 seconds.

On heating, water present in the binder composition evaporates, and the composition undergoes curing. These processes can take place in succession or simultaneously. Curing in the present context is to be understood as meaning the chemical alteration of the composition, for example crosslinking through formation of covalent bonds between the various constituents of the composition, especially the esterification reaction between pendant carboxyl (—COOH) of modified copolymer and the hydroxyl (—OH) moieties both of the modified copolymer and any added polyol(s), the formation of ionic interactions and clusters, and formation of hydrogen bonds.

Alternatively or in addition to heating the fiberglass product catalytic curing can be used to cure the fiberglass product. Catalytic curing of the fiberglass product can include the addition of an acid catalyst. Illustrative acid catalysts can include, but are not limited to, ammonium chloride or p-toluenesulfonic acid.

In one or more embodiments, the drying and curing of the binder composition can be conducted in two or more distinct steps. For example, the composition may be first heated at a temperature and for a time sufficient to substantially dry but not to substantially cure the binder composition and then heated for a second time at a higher temperature and/or for a longer period of time to effect curing (cross-linking to a thermoset structure). Such a preliminary procedure, referred to as "B-staging," may be used to provide a binder-treated product, for example, in roll form, which may at a later stage be fully cured, with or without forming or molding into a particular configuration, concurrent with the curing process. This makes it possible, for example, to use fiberglass products which can be molded and cured elsewhere.

The fiber mat product can be formed as a relatively thin product of about 0.25 mm (10 mils) to a relatively thick product of about 25.4 mm (1,000 mils). Depending on formation conditions, the density of the product can also be varied from a relatively fluffy low density product to a higher density of about 6 to about 10 pounds per cubic foot or higher. In one or more embodiments, the fiber mat product can have a basis weight ranging from a low of about 0.1 pound, about 0.5 pounds, or about 0.8 pounds to a high of about 3 pounds, about 4 pounds, or about 5 pounds per 100 square feet. For example, the fiber mat product can have a basis weight from about 0.6 pounds per 100 square feet to about 2.8 pounds per 100 square feet, about 1 pound per 100 square feet to about 2.5 pounds per 100 square feet, or about 1.5 pounds per 100 square feet to about 2.2 pounds per 100 square feet. In at least one specific embodiment, the fiber mat product can have a basis weight of about 1.2 pounds per 100 square feet, about 1.8 pounds per 100 square feet, or about 2.4 pounds per 100 square feet.

The fibers can represent the principal material of the nonwoven fiber products, such as a fiberglass mat product. For example, 60 wt % to about 90 wt % of the fiberglass product, based on the combined amount of binder and fibers can be composed of the fibers. The binder composition can be applied in an amount such that the cured binder constitutes from about 1 wt % to about 40 wt % of the finished glass fiber product. The binder composition can be applied in an amount such that the cured binder constitutes a low from about 1 wt %, about 5 wt %, or about 10 wt % to a high of about 15 wt %, about 20 wt %, or about 25 wt %.

Fiberglass products may be used by themselves or incorporated into a variety of products. For example, fiberglass products can be used as or incorporated into insulation batts or rolls, composite flooring, asphalt roofing shingles, siding, gypsum wall board, roving, microglass-based substrate for printed circuit boards, battery separators, filter stock, tape stock, carpet backing, and as reinforcement scrim in cementitious and non-cementitious coatings for masonry.

The fiberglass mat product can have a thickness ranging from a low of about 0.25 mm (10 mils), about 0.63 mm (25 mils), about 0.76 mm (30 mils), about 1.3 mm (50 mils), or about 1.9 mm (75 mils) to a high of about 6.4 mm (250 mils), about 12.7 mm (500 mils), about 19 mm (750 mils), or about 25.4 mm (1,000 mils). For example, the fiberglass mat product can have a thickness of about 0.5 mm (20 mils), about 1 mm (39 mils) about, or about 2 mm (79 mils). In another example, the fiberglass mat product can have a thickness from about 0.5 mm (20 mils) to about 1.3 mm (50 mils), about 0.6 mm (25 mils) to about 1.1 mm (45 mils), or about 0.8 mm (30 mils) to about 1 mm (40 mils).

In one or more embodiments, fiberglass mats containing one or more of the binder compositions disclosed herein can have an average dry tensile strength of at least 50 lbs/3 inch; at least 75 lbs/3 inch, at least 100 lbs/3 inch, at least 110 lbs/3 inch, at least 115 lbs/3 inch, at least 120 lbs/3 inch, at least 125 lbs/3 inch, at least 130 lbs/3 inch, at least 135 lbs/3 inch, at least 140 lbs/3 inch, at least 145 lbs/3 inch, at least 150 lbs/3 inch, at least 155 lbs/3 inch, at least 160 lbs/3 inch, at least 165, lbs/3 inch, at least 170 lbs/3 inch, at least 175 lbs/3 inch, at least 180 lbs/3 inch, at least 185 lbs/3 inch, at least 190 lbs/3 inch, at least 195, or at least 200 lbs/3 inch. For example, fiberglass mats containing one or more of the binder compositions disclosed herein can have an average dry tensile strength from about 100 lbs/3 inch to about 135 lbs/3 inch, or from about 115 lbs/3 inch to about 145 lbs/3 inch, or from about 120 lbs/3 inch to about 150. The average dry tensile strength of the fiberglass mats can be determined using a Thwing-Albert Tensile Tester. The average dry tensile strength of the fiberglass mats can be determined according to the Technical Association of the Pulp and Paper Industry (TAPPI) test method—tensile strength and elongation at break for fiber glass mats, test method T 1009, using a 3 inch sample size.

In one or more embodiments, fiberglass mats containing one or more of the binder compositions disclosed herein can have an average Elmendorf tear strength of about 275 grams force ("gf"), about 300 gf, about 325 gf, about 350 gf, about 375 gf, about 400 gf, about 425 gf, 450 gf, about 475 gf, about 500 gf, about 525 gf, about 550 gf, about 575 gf, about 600 gf, about 625 gf, about 650 gf, about 675 gf, about 700 gf, about 725 gf, about 750 gf, about 775 gf, or about 800 gf. In one or more embodiments, fiberglass mats containing one or more of the binder compositions disclosed herein can have an average tear strength of at least 485 gf, at least 490 gf, at least 495 gf, at least 500 gf, at least 505 gf, at least 510 gf, at least 515 gf, at least 520 gf, at least 525 gf, at least 530 gf, at least 535 gf, at least 540 gf, at least 545 gf, at least 550 gf, at least 555 gf, at least 560 gf, at least 565 gf, at least 570 gf, or at least 575 gf. In one or more embodiments, fiberglass mats containing one or more of the binder compositions disclosed herein can have an average tear strength ranging from a low of about 500 gf, about 525 gf, about 550 gf, or about 575 gf to a high of about 590 gf, about 620 gf, about 650 gf, about 700 gf, about 750 gf, about 800 gf, about 850 gf, or about 900 gf.

In one or more embodiments, the fiberglass mats can have a basis weight ("BW") ranging from a low of about 1.5 lbs/100 ft$^2$, about 1.6 lbs/100 ft$^2$, about 1.7 lbs/100 ft$^2$, or about 1.8 lbs/100 ft$^2$ to a high of about 2 lbs/100 ft$^2$, about 2.1 lbs/100 ft$^2$, about 2.2 lbs/100 ft$^2$, or about 2.3 lbs/100 ft$^2$. For example, the fiberglass mats can have a basis weight of about 1.65 lbs/100 ft$^2$, about 1.75 lbs/100 ft$^2$, about 1.85 lbs/100 ft$^2$, about 1.95 lbs/100 ft$^2$, or about 2.1 lbs/100 ft$^2$.

In one or more embodiments, the fiberglass mats can have a percent of hot-wet retention ("% HW") of greater than about 50%, about 55%, about 60%, about 65%, about 70%, about 75%, about 80%, about 85%, about 80%, or about 95%.

EXAMPLES

In order to provide a better understanding of the foregoing discussion, the following non-limiting examples are offered. Although the examples may be directed to specific embodiments, they are not to be viewed as limiting the invention in any specific respect. All parts, proportions, and percentages are by weight unless otherwise indicated.

Example I

Examples 1 and 2 are a 3,000 molecular weight (Mw) SMA solution with TEA. Example 1 and 2 polymers were made by adding 200 g of 3,000 Mw SMA, 352 g of water, 14 g MEA, 80 g of TEA, and 33 g of aqueous ammonia (28%) to a standard sealed polymer reactor. The mixture was heated to about 98° C. for about 4 to about 6 hours at which point the SMA had dissolved and the solutions became clear. The final pH was between about 8 and 8.5. The Example 3 and 4 polymers were the same SMA-TEA solution as Examples 1 and 2; however, the SMA-TEA solution was modified with a dextrose solution by adding 172 g of a 50% dextrose solution to 200 g of the SMA-TEA solution. The comparative examples (C5 and C6) are a 10% latex modified urea formaldehyde polymer that yields a high tear strength glass mat. The urea formaldehyde polymer, prior to modifying with the 10% latex, is referred to herein as the "unmodified UF polymer." The 10% latex modified urea-formaldehyde polymer was blended, at room temperature, directly with the UF polymer for about 30 minutes. A Rohm and Haas model 4297 was used to blend the 10% latex modified UF polymer and all other examples having two or more components blended or mixed.

TABLE 1

| Ex. No. | Cure Time, sec. | Avg Dry Tensile, lbs/3 in | BW, lbs/100 ft² | Avg. Tear, gf | % LOI | $DT_N$ | % HW |
|---|---|---|---|---|---|---|---|
| 1 | 70 | 136.6 | 1.83 | 589 | 19.9 | 3.75 | 83.7 |
| 2 | 90 | 140.7 | 1.81 | 511 | 19.4 | 4.01 | 78.8 |
| 3 | 70 | 100.9 | 1.84 | 650 | 20.4 | 2.69 | 95.8 |
| 4 | 90 | 120.0 | 1.83 | 561 | 19.7 | 3.33 | 84.8 |
| C5 | 50 | 128.4 | 1.82 | 485 | 19.7 | 3.58 | 76.3 |
| C6 | 70 | 127.1 | 1.84 | 518 | 20.1 | 3.44 | 78.2 |

For all inventive examples (1-4, 7, 8, 10-16, 18-19, and 21-24) and comparative examples (C5, C6, C9, C17, C20, C25 and C26) discussed herein, a handsheet study was performed for each sample. Dilutions were made to approximately 13% solids with PAA white water. PAA white water is an aqueous solution of polyacrylamide. The PAA white water also included 3.75 g/4 L of dispersant. The handsheets were cured at a temperature of 205° C. for various times. The curing time for Examples 1-4, 7, 8, 10-16, and 18-21 and comparative examples C5, C6, C9, C17, and C20 are is listed in Tables 1-4. For Examples 21-24 and comparative examples C25 and C26, the curing time was 70 seconds.

Three handsheets for each example were made. The handsheets were 10.5 in.×10.5 in. The thickness of the handsheets prior to curing, i.e. while wet, were not measured. The thickness of the handsheets after curing was about 35 mils. The glass fibers for Examples I, II, and III had an average length of about 1.25 inches. The glass fibers for Examples IV and V had an average length of about 0.75 inches. Each set was tested for dry and wet tensile strength on a Thwing-Albert tensile tester (0-200 kg load cell) and Elmendorf tear strength on a Thwing-Albert Pro Tear (1600 g pendulum).

For the Elmendorf tear strength tests and the tear strength values referred to herein were determined according to the following procedure. The instrument was leveled and calibrated before testing. The test samples were cut to a width of 63 mm (2.48 in.) in the tearing direction and a length of about 75 mm (3 in.). The samples were long enough to be held by the full width of each sample clamp. The test samples were placed in the clamps of the tester while ensuring that the bottom of each sample rested squarely on the bottom of the sample clamps. The sample was aligned with the front edge of the pendulum clamp. Any excess material was allowed to hang over the rear of the stationary clamp. The clamps were then dosed. The cutter handle was then pressed all the way down to cut a 20 mm (0.79 in) slit in the sample. The "test" key of the instrument was then pressed and the pendulum was allowed to make one full swing in the tearing direction and the pendulum was stopped on the return swing and gently lowered until it rested against the pendulum stop.

Percent loss of ignition ("% LOI") was determined by weighing samples after 30 minutes at 650° C. Percent hot-wet retention ("% HW") is the amount of dry tensile strength retained after immersing the sample in an 80° C. water bath for 10 minutes. Replications for each test were made and standard deviations for each example were calculated. The average tear strength values shown in Tables 1-5 are the average of 9 measurements, i.e. the average of three tests performed on each handsheet. The dry tensile number ("$DT_N$") values shown in Tables 1-5 are the average of 6 measurements, i.e. the average of two tests performed on each handsheet. The percent loss of ignition ("LOI") and Basis Weight ("BW") shown in Tables 1-5 are the average of 3 measurements, i.e. the average of one test performed on each handsheet.

Referring to Table 1, Examples 1-4 and comparative examples (C5 and C6) had a hot-wet retention rate ("% HW") >75% under the various cure conditions. Overall, Examples 3 and 4 had a higher hot-wet retention rate as compared to Examples 1 and 2 and the comparative examples (C5 and C6). As shown in Table 1, the average dry tensile strength for Examples 1, 2 and 4 were statistically equal to the comparative examples (C5 and C6). The average dry tensile strength for Example 3 was statistically less than the comparative examples (C5 and C6).

Due to the variation in basis weight ("BW"), loss of ignition ("LOI"), and hot-wet retention ("HW"), the dry tensile number ("$DT_N$") was calculated for each binder composition. The $DT_N$ was determined from the following equation:

$$DT_N = \frac{\text{dry tensile strength}}{(LOI * \text{basis weight})}$$

When $DT_N$ was calculated, there was an improvement noted for Examples 1 and 2 over the comparative examples (C5 and C6). Specifically, Examples 1 and 2 had $DT_N$ values of 3.75 and 4.01, respectively; while the comparative examples (C5 and C6) had $DT_N$ values of 3.58 and 3.44, respectively.

Examples 1, 3 and 4, which were cured for 70 seconds, 70 seconds, and 90 seconds, respectively; each had a higher average tear strength (gf) than the comparative examples (C5 and C6).

Example II

Two inventive examples (7 and 8) and one comparative example (C9) are provided and summarized below in Table 2. Examples 7 and 8 are two acrylic solutions combined with an unmodified UF polymer. Specifically, Example 7 was a polymer containing a combination of an unmodified UF polymer and the Example 1 polymer. For Example 7, the ratio of unmodified UF polymer to the Example 1 polymer was 40 wt % to 60 wt % (40:60). Example 8 is a polymer containing a combination of an unmodified UF polymer and the Example 3 polymer. For Example 8, the ratio of unmodified UF polymer to the Example 3 polymer was 40 wt % to 60 wt % (40:60). As discussed above, the unmodified UF polymer for both Example 7 and 8 is the same polymer as the Comparative Examples 5 and 6, but without the 10% latex. The unmodified UF polymer used to make Examples 7 and 8 was made by standard techniques for making urea-formaldehyde polymers, such as those discussed and described in U.S. Pat. No. 5,362,842. Comparative Example C9 is the same 10% latex modified UF polymer used for comparative examples C5 and C6.

TABLE 2

| Ex. No. | Cure Time, sec. | Avg Dry Tensile, lbs/3 in | BW, lbs/100 ft² | Avg. Tear, gf | % LOI | $DT_N$ | % HW |
|---|---|---|---|---|---|---|---|
| 7 | 70 | 137.3 | 1.82 | 593 | 20.5 | 3.69 | 57.7 |
| 8 | 90 | 133.8 | 1.82 | 716 | 20.1 | 3.67 | 53.0 |
| C9 | 70 | 135.9 | 1.81 | 470 | 20.6 | 3.65 | 72.8 |

All examples had a hot-wet retention rate ("% HW")>50% under the various cure conditions. Overall, Examples 7 and 8 had a lower hot-wet retention rate as compared to comparative example (C9).

The average dry tensile strength and the $DT_N$ were statistically equal for the inventive Examples 7 and 8 and the comparative example C9. However, the average tear strength for both Example 7 and 8 increased from the comparative example (C9) value of 470 to 593 and 716, respectively. Surprisingly and unexpectedly the tensile strength of both Example 7 and 8 was maintained at 137.3 lbs/3 in and 133.8 lbs/3 in, which are about equal to the comparative example (C9) of 135.9 lbs/3 in. The substantial increase in tear strength while maintaining the tensile strength is contrary to what is normally observed, as an increase in mat tear strength is normally accompanied by a decrease in tensile strength.

Example III

Seven inventive polymers (Examples 10-16) and one comparative example (C17) are provided and summarized below in Table 3. The polymer used in above Examples 3 and 4 was further studied by varying the cure time in order to modify the properties of the polymers. These samples correspond to Examples 10-14. Also, the polymer used in Examples 3 and 4 was blended with unmodified UF polymer in order to determine if lower levels of acrylic in the polymer will improve properties of the samples and not require the addition of the latex. Example 15 is a blend of 14% by weight of the Examples 3 and 4 polymer and 86% by weight of the unmodified UF polymer. Example 16 is a blend of 27% by weight of the Examples 3 and 4 polymer and 73% by weight of the unmodified UF polymer.

TABLE 3

| Ex. No. | Cure Time, sec. | Avg Dry Tensile, lbs/3 in | BW, lbs/100 ft² | Avg. Tear, gf | % LOI | $DT_N$ | % HW |
|---|---|---|---|---|---|---|---|
| 10 | 35 | 72.3 | 1.83 | 915 | 20.5 | 1.94 | 102.5 |
| 11 | 50 | 88.2 | 1.83 | 916 | 19.8 | 2.44 | 95.2 |
| 12 | 65 | 105.5 | 1.82 | 764 | 19.9 | 2.91 | 91.5 |
| 13 | 80 | 107.0 | 1.82 | 752 | 19.4 | 3.03 | 87.7 |
| 14 | 95 | 108.8 | 1.82 | 621 | 18.9 | 3.16 | 90.9 |
| 15 | 70 | 154.3 | 1.84 | 580 | 20.0 | 4.20 | 67.8 |
| 16 | 70 | 155.0 | 1.83 | 580 | 19.7 | 4.31 | 62.2 |
| C17 | 70 | 134.5 | 1.83 | 593 | 19.3 | 3.82 | 74.9 |

All the Examples 10-16 and the comparative example (C17) had a hot-wet retention rate (% HW)>60%. Increasing the cure time from 35 seconds to 95 seconds for Examples 10-14, had very little effect on the hot-wet retention for the inventive polymer. Examples 15 and 16, which are the two blends, had a lower hot-wet retention than Examples 10-14 and the comparative example (C17). This result is similar to the Examples 7 and 9, which were also polymer blends.

As the cure time increased from 35 to 95 seconds for Examples 10-14, the average dry tensile strength also increased from 72.3 lbs/3 in to 108.8 lbs/3 in. However, all of the Examples 10-14 had a lower average dry tensile strength than the comparative example (C17). Interestingly, Examples 15 and 16, the blends, had a higher average dry tensile strength than the comparative example (C17).

The average tear strength for Examples 10-14, which ranged from 915 gf to 621 gf, were all significantly greater than the comparative example (C17) and Examples 15 and 16. For examples 10-14, as the cure time increased from 35 seconds to 95 seconds, the average tear strength decreased from 915 gf to 621 gf.

Example IV

Two inventive polymers (Examples 18 and 19) and one comparative polymer (C20) are provided and summarized below in Table 4. Examples 18 and 19 evaluate the effect dextrose has as a modifier for urea formaldehyde polymers. A 40% solution of dextrose was used as a modifier for the unmodified urea-formaldehyde polymer. The dextrose was added to the urea-formaldehyde polymer by blending, at room temperature, the 40% solution of dextrose for about 30 minutes. Specifically, Examples 18 and 19 were modified to include 7.7 wt % and 15 wt % dextrose, respectively.

TABLE 4

| Ex. No. | Post Addition Modifier | Cure Time, sec. | Avg Dry Tensile, lbs/3 in | BW, lbs/100 ft2 | Avg. Tear, gf | % LOI | $DT_N$ | % HW |
|---|---|---|---|---|---|---|---|---|
| 18 | 7.7 wt % dextrose | 70 | 119.1 | 1.81 | 490 | 19.5 | 3.37 | 71.9 |
| 19 | 15 wt % dextrose | 70 | 117.4 | 1.80 | 562 | 19 | 3.42 | 68.3 |
| C20 | None | 70 | 114.2 | 1.81 | 439 | 20.1 | 3.14 | 89.4 |

The dextrose modified polymers (Examples 18 and 19) and the comparative example (C20) all had hot-wet retention rates (% HW)>68%.

As shown in Table 4, dextrose modified polymers (Examples 18 and 19) provide a glass mat with a statistically equal tensile strength as compared to the comparative polymer C20. However, the dextrose modified polymers (Examples 18 and 19) show significant increases in tear strength. Specifically, the average tear strength for the dextrose modified polymers (Examples 18 and 19) increased from the comparative polymer (C20) value of 439 to 490 and 562, respectively. This result is surprising and unexpected as an increase in tear is normally accompanied by a decrease in tensile strength.

Example V

Four inventive polymers (Examples 21-24) and two comparative polymers (C25 and C26) are provided and summarized below in Table 5. Example 21 is a blend of the unmodified UF polymer and the inventive polymer of Examples 3 and 4, discussed above. Specifically, Example 24 contains 80% by weight unmodified UF polymer and 20% by weight of the inventive polymer of Examples 3 and 4. Example 22 is a blend of the unmodified UF polymer and the inventive polymer of Examples 1 and 2, discussed above. Specifically, Example 22 contains 80% by weight unmodified UF polymer and 20% by weight of the inventive polymer of Examples 1 and 2. Example 23 is the inventive polymer of Examples 3 and 4 and Example 27 is the inventive polymer of Examples 1 and 2, discussed above. The comparative example (C25) was a standard urea-formaldehyde polymer modified with 10% RH 618 latex posted blended at room temperature for 30 minutes. The comparative example C26 was the same 10% latex modified polymer of comparative examples (C5 and C6). All Examples 21-24 and the comparative examples (C25 and C26) were cured for 70 seconds at a temperature of 205° C.

TABLE 5

| Ex. No. | Post Addition Modifier | Avg Dry Tensile, lbs/3 in | BW, lbs/100 ft² | Avg. Tear, gf | % LOI | $DT_N$ | % HW |
|---|---|---|---|---|---|---|---|
| 21 | 20 wt % Examples 3 and 4 Polymer | 167.8 | 2.20 | 675 | 21.9 | 3.47 | 62.0 |
| 22 | 20 wt % Examples 1 and 2 Polymer | 177.5 | 2.18 | 633 | 21.5 | 3.79 | 52.9 |
| 23 | None | 140.3 | 2.18 | 601 | 20.3 | 3.17 | 75.1 |
| 24 | None | 200.8 | 2.17 | 625 | 21.0 | 4.41 | 65.7 |
| C25 | None | 162.7 | 2.20 | 558 | 21.3 | 3.47 | 68.4 |
| C26 | None | 174.1 | 2.16 | 502 | 21.1 | 3.82 | 65.3 |

All the Examples 21-24 and the comparative examples (C25 and C26) had a hot-wet retention rate (% HW)>52%. However, Example 22 that contained the 80% by weight unmodified UF polymer and 20% by weight of the inventive polymer of Examples 1 and 2 had a noticeably lower hot-wet retention rate compared to the other examples. Examples 21-22 all had statistically equal average dry tensile strengths to that of the comparative examples (C25 and C26). Surprisingly, Example 24 had the highest average dry tensile strength of 200.8 lbs/3 in, which was an increase of more than 25 lbs/3 in. over the comparative examples (C25 and C26). As mentioned above, a substantial increase in tear strength while maintaining tensile strength is contrary to what is normally observed, as an increase in tear strength is normally accompanied by a decrease in tensile strength. Increasing both the tensile strength and the tear strength was surprising and unexpected.

Embodiments of the present invention further relate to any one or more of the following paragraphs:

1. A fiberglass mat, comprising: a plurality of glass fibers; and a binder composition comprising: a copolymer comprising one or more unsaturated carboxylic acids, one or more unsaturated carboxylic anhydrides, or a combination thereof, and one or more vinyl aromatic derived units; and one or more amines, wherein the binder composition has a weight average molecular weight (Mw) of about 500 to about 180,000, and wherein the fiberglass mat has a thickness ranging from about 10 mils to about 1,000 mils, an average dry tensile strength of at least 50 lbs/3 inch; and an average Elmendorf tear strength of at least 300 gf.

2. The fiberglass mat of paragraph 1, wherein the one or more vinyl aromatic derived units comprise styrene.

3. The fiberglass mat according to paragraph 1 or 2, wherein the copolymer is present in an amount ranging from about 50 mol % to about 90 mol %, based on a total weight of the copolymer and the one or more amines.

4. The fiberglass mat according to any one of paragraphs 1 to 3, wherein the one or more amines are present in an amount ranging from about 0.01 mol % to about 0.40 mol %, based on a total weight of the copolymer and the one or more amines.

5. The fiberglass mat according to any one of paragraphs 1 to 4, wherein the copolymer comprises from about 7 mol % to about 50 mol % of the one or more unsaturated carboxylic acids, the one or more unsaturated carboxylic anhydrides, or the combination thereof, based on a total weight of the one or more unsaturated carboxylic acids, the one or more unsaturated carboxylic anhydrides, or the combination thereof and the one or more vinyl aromatic derived units.

6. The fiberglass mat according to any one of paragraphs 1 to 5, wherein the copolymer comprises from about 60 mol % to about 80 mol % of the one or more vinyl aromatic derived units, based on a total weight of the one or more unsaturated carboxylic acids, the one or more unsaturated carboxylic anhydrides, or the combination thereof and the one or more vinyl aromatic derived units.

7. The fiberglass mat according to any one of paragraphs 1 to 6, wherein the binder composition is substantially free of formaldehyde.

8. The fiberglass mat according to any one of paragraphs 1 to 7, wherein the one or more amines comprise an alkanolamine.

9. The fiberglass mat of paragraph 8, wherein the alkanolamine comprises a tertiary alkanolamine.

10. The fiberglass mat of paragraph 8, wherein the alkanolamine comprises triethanolamine.

11. The fiberglass mat according to any one of paragraphs 1 to 10, wherein the plurality of glass fibers have a length ranging from about 3 mm to about 50 mm and a diameter ranging from about 5 µm to about 40 µm.

12. The fiberglass mat according to any on of paragraphs 1 to 11, wherein the one or more unsaturated carboxylic acids comprise maleic acid, aconitic acid, itaconic acid, acrylic acid, methacrylic acid, crotonic acid, isocrotonic acid, citraconic acid, fumaric acid, or any combination thereof, and wherein the one or more unsaturated carboxylic anhydrides comprise maleic anhydride, aconitic anhydride, itaconic anhydride, acrylic anhydride, methacrylic anhydride, crotonic anhydride, isocrotonic anhydride, citraconic anhydride, or any combination thereof.

13. The fiberglass mat according to any one of paragraphs 1 to 12, wherein the copolymer further comprises at least one other polymer blended therewith.

14. The fiberglass mat according to any one of paragraphs 1 to 13, wherein the at least one other copolymer comprises styrene acrylic acid, polyacrylic acid, or a combination thereof.

15. A fiberglass mat, comprising: a plurality of glass fibers; and a binder composition comprising: a first copolymer comprising one or more unsaturated carboxylic acids, one or more unsaturated carboxylic anhydrides, or a combination thereof, and one or more vinyl aromatic derived units; one or more amines; and a second copolymer, wherein the binder composition has a weight average molecular weight (Mw) of about 500 to about 180,000.

16. The fiberglass mat of paragraph 15, wherein the one or more vinyl aromatic derived units comprise styrene.

17. The fiberglass mat according to paragraph 15 or 16, wherein the first copolymer is present in an amount ranging from about 50 mol % to about 90 mol %, based on a total weight of the first copolymer and the one or more amines.

18. The fiberglass mat according to any one of paragraphs 15 to 17, wherein the one or more amines are present in an amount ranging from about 0.01 mol % to about 0.40 mol %, based on a total weight of the first copolymer and the one or more amines.

19. The fiberglass mat according to any one of paragraphs 15 to 18, wherein the first copolymer comprises from about 7 mol % to about 50 mol % of the one or more unsaturated carboxylic acids, the one or more unsaturated carboxylic anhydrides, or the combination thereof, based on a total weight of the one or more unsaturated carboxylic acids, the one or more unsaturated carboxylic anhydrides, or the combination thereof and the one or more vinyl aromatic derived units.

20. The fiberglass mat according to any one of paragraphs 15 to 19, wherein the first copolymer comprises from about 60 mol % to about 80 mol % of the one or more vinyl aromatic derived units, based on a total weight of the one or more unsaturated carboxylic acids, the one or more unsaturated carboxylic anhydrides, or the combination thereof and the one or more vinyl aromatic derived units.

21. The fiberglass mat according to any one of paragraphs 15 to 20, wherein the plurality of glass fibers have a length ranging from about 3 mm to about 50 mm and a diameter ranging from about 5 µm to about 40 µm.

22. The fiberglass mat according to any one of paragraphs 15 to 21, wherein the fiberglass mat has a thickness ranging from about 10 mils to about 1,000 mils; an average dry tensile strength of at least 50 lbs/3 inch; and an average Elmendorf tear strength of at least 300 gf.

23. The fiberglass mat according to any one of paragraphs 15 to 22, wherein the second copolymer comprises urea-formaldehyde, phenol-formaldehyde, melamine-formaldehyde, phenol-resorcinol-formaldehyde, resorcinol-formaldehyde, melamine-urea-formaldehyde, phenol-urea-formaldehyde, a copolymer of acrylic acid and one or more unsaturated carboxylic acid monomers, a copolymer of acrylic acid and one or more hydroxyl containing unsaturated monomers, a copolymer of acrylic acid and one or more vinyl derived units, or any combination thereof.

24. The fiberglass mat according to any one of paragraphs 15 to 23, wherein the one or more amines comprise an alkanolamine.

25. A fiberglass mat, comprising: a plurality of glass fibers; and a binder composition comprising: a copolymer comprising one or more unsaturated carboxylic acids, one or more unsaturated carboxylic anhydrides, or a combination thereof, and one or more vinyl aromatic derived units; one or more amines; and one or more carbohydrates, one or more polyols, or a combination thereof, wherein the binder composition has a weight average molecular weight (Mw) of about 500 to about 180,000.

26. The fiberglass mat of paragraph 25, wherein the one or more vinyl aromatic derived units comprise styrene.

27. The fiberglass mat of paragraph 25 or 26, wherein the copolymer is present in an amount ranging from about 50 mol % to about 90 mol %, based on a total weight of the copolymer and the one or more amines.

28. The fiberglass mat according to any one of paragraphs 25 to 27, wherein the one or more amines are present in an amount ranging from about 0.01 mol % to about 0.40 mol %, based on a total weight of the copolymer and the one or more amines.

29. The fiberglass mat according to any one of paragraphs 25 to 28, wherein the copolymer comprises from about 7 mol % to about 50 mol % of the one or more unsaturated carboxylic acids, the one or more unsaturated carboxylic anhydrides, or the combination thereof, based on a total weight of the one or more unsaturated carboxylic acids, the one or more unsaturated carboxylic anhydrides, or the combination thereof and the one or more vinyl aromatic derived units.

30. The fiberglass mat according to any one of paragraphs 25 to 29, wherein the copolymer comprises from about 60 mol % to about 80 mol % of the one or more vinyl aromatic derived units, based on total weight of the one or more unsaturated carboxylic acids, the one or more unsaturated carboxylic anhydrides, or the combination thereof and the one or more vinyl aromatic derived units.

31. The fiberglass mat according to any one of paragraphs 25 to 30, wherein the binder composition is substantially free of formaldehyde.

32. The fiberglass mat according to any one of paragraphs 25 to 31, wherein the one or more amines comprise an alkanolamine.

33. The fiberglass mat of paragraph 32, wherein the alkanolamine comprises a tertiary alkanolamine.

34. The fiberglass mat of paragraph 32, wherein the alkanolamine comprises triethanolamine.

35. The fiberglass mat according to any one of paragraphs 25 to 34, wherein the one or more carbohydrates comprise one or more monosaccharides, one or more disaccharides, one or more oligosaccharides, one or more polysaccharides, or any combination thereof.

36. The fiberglass mat according to any one of paragraphs 25 to 35, wherein the one or more carbohydrates comprise one or more monosaccharides.

37. The fiberglass mat according to any one of paragraphs 25 to 36, wherein the one or more carbohydrates comprise dextrose monohydrate.

38. The fiberglass mat according to any one of paragraphs 25 to 37, wherein the one or more polyols comprise ethylene glycol, trimethylol propane, sorbitol, polyglycerol, or any combination thereof.

39. The fiberglass mat according to any one of paragraphs 25 to 38, wherein the plurality of glass fibers have a length ranging from about 3 mm to about 50 mm and a diameter ranging from about 5 µm to about 40 µm.

40. The fiberglass mat according to any one of paragraphs 25 to 39, wherein the fiberglass mat has a thickness ranging from about 10 mils to about 1,000 mils; an average dry tensile strength of at least 50 lbs/3 inch; and an average Elmendorf tear strength of at least 300 gf.

41. A fiberglass mat, comprising: a plurality of glass fibers; and a binder composition comprising: a first copolymer comprising one or more unsaturated carboxylic acids, one or more unsaturated carboxylic anhydrides, or a combination thereof, and one or more vinyl aromatic derived units; one or more amines; a second copolymer; and one or more carbohydrates, one or more polyols, or a combination thereof, wherein the binder composition has a weight average molecular weight (Mw) of about 500 to about 180,000.

42. The fiberglass mat of paragraph 41, wherein the one or more vinyl aromatic derived units comprise styrene.

43. The fiberglass mat of paragraph 41 or 42, wherein the first copolymer is present in an amount ranging from about 50 mol % to about 90 mol %, based on a total weight of the first copolymer and the one or more amines.

44. The fiberglass mat according to any one of paragraphs 41 to 43, wherein the one or more amine are present in an amount ranging from about 0.01 mol % to about 0.40 mol %, based on a total weight of the first copolymer and the one or more amines.

45. The fiberglass mat according to any one of paragraphs 41 to 44, wherein the first copolymer comprises from about 7 mol % to about 50 mol % of the one or more unsaturated carboxylic acids, one or more unsaturated carboxylic anhydrides, or the combination thereof, based on a total weight of the one or more unsaturated carboxylic acids, one or more unsaturated carboxylic anhydrides, or a combination thereof and the one or more vinyl aromatic derived units.

46. The fiberglass mat according to any one of paragraphs 41 to 45, wherein the first copolymer comprises from about 60 mol % to about 80 mol % of the one or more vinyl aromatic derived units, based on a total weight of the one or more unsaturated carboxylic acids, one or more unsaturated carboxylic anhydrides, or the combination thereof and the one or more vinyl aromatic derived units.

47. The fiberglass mat according to any one of paragraphs 41 to 46, wherein the plurality of glass fibers have a length ranging from about 3 mm to about 50 mm and a diameter ranging from about 5 µm to about 40 µm.

48. The fiberglass mat according to any one of paragraphs 41 to 47, wherein the fiberglass mat has a thickness ranging from about 10 mils to about 1,000 mils; an average dry tensile strength of at least 50 lbs/3 inch; and an average Elmendorf tear strength of at least 300 gf.

49. The fiberglass mat according to any one of paragraphs 41 to 48, wherein the second copolymer comprises urea-formaldehyde, phenol-formaldehyde, melamine-formaldehyde, phenol-resorcinol-formaldehyde, resorcinol-formaldehyde, melamine-urea-formaldehyde, phenol-urea-formaldehyde, a copolymer of acrylic acid and one or more unsaturated carboxylic acid monomers, a copolymer of acrylic acid and one or more hydroxyl containing unsaturated monomers, a copolymer of acrylic acid and one or more vinyl derived units, or any combination thereof.

50. The fiberglass mat according to any one of paragraphs 41 to 49, wherein the one or more amines comprise an alkanolamine.

51. A fiberglass mat, comprising: a plurality of glass fibers; and a binder composition comprising: one or more carbohydrates, one or more polyols, or a combination thereof; and a copolymer comprising urea-formaldehyde, phenol-formaldehyde, melamine-formaldehyde, phenol-resorcinol-formaldehyde, resorcinol-formaldehyde, melamine-urea-formaldehyde, phenol-urea-formaldehyde, a copolymer of acrylic acid and one or more unsaturated carboxylic acid monomers, a copolymer of acrylic acid and one or more hydroxyl containing unsaturated monomers, a copolymer of acrylic acid and one or more vinyl derived units, or any combination thereof.

52. The fiberglass mat of paragraph 51, wherein the one or more carbohydrates, one or more polyols, or the combination thereof are present in an amount ranging from about 1 wt % to about 50 wt %, based on a total weight of the copolymer and the one or more carbohydrates, one or more polyols, or the combination thereof.

53. The fiberglass mat of paragraph 51 or 52, wherein the one or more carbohydrates, one or more polyols, or the combination thereof are present in an amount ranging from about 5 wt % to about 30 wt %, based on a total weight of the copolymer and the one or more carbohydrates, one or more polyols, or the combination thereof.

54. The fiberglass mat according to any one of paragraphs 51 to 53, wherein the one or more carbohydrates comprise monosaccharides, disaccharides, oligosaccharides, polysaccharides, dextrin, maltodextrin, oxidized maltodextrin, or any combination thereof.

55. The fiberglass according to any one of paragraphs 51 to 54, wherein the one or more carbohydrates comprise one or more monosaccharides.

56. The fiberglass mat according to any one of paragraphs 51 to 55, wherein the one or more carbohydrates comprise dextrose monohydrate.

57. The fiberglass mat according to any one of paragraphs 51 to 56, wherein the one or more polyols comprise ethylene glycol, trimethylol propane, sorbitol, polyglycerol, or any combination thereof.

58. The fiberglass mat according to any one of paragraphs 51 to 57, wherein the plurality of glass fibers have a length ranging from about 3 mm to about 50 mm and a diameter ranging from about 5 µm to about 40 µm.

59. The fiberglass mat according to any one of paragraphs 51 to 58, wherein the fiberglass mat has a thickness ranging from about 10 mils to about 1,000 mils; an average dry tensile strength of at least 50 lbs/3 inch; and an average Elmendorf tear strength of at least 300 gf.

60. A fiberglass mat, comprising: a plurality of glass fibers and an at least partially cured binder composition, wherein the binder composition, prior to at least partial curing, comprises: a first copolymer modified by reaction with one or more base compounds, wherein: the first copolymer comprises one or more unsaturated carboxylic acids, one or more unsaturated carboxylic anhydrides, or a combination thereof, and one or more vinyl aromatic derived units, the first copolymer has a weight average molecular weight (Mw) of about 500 to about 200,000, and the first copolymer is present in an amount ranging from about 60 wt % to about 95 wt %, based on a combined weight of the first copolymer and the one or more base compounds.

61. The fiberglass mat according to paragraph 60, wherein the plurality of glass fibers have a length ranging from about 3 mm to about 50 mm and a diameter ranging from about 5 µm to about 40 µm, and wherein the fiberglass mat has a thickness ranging from about 10 mils to about 1,000 mils, an average dry tensile strength of at least 50 lbs/3 inch, and an average Elmendorf tear strength of at least 300 gf.

62. The fiberglass mat according to paragraph 60 or 61, wherein the binder composition, prior to at least partial curing, further comprises a second copolymer, and wherein the second copolymer comprises urea-formaldehyde, phenol-formaldehyde, melamine-formaldehyde, phenol-resorcinol-formaldehyde, resorcinol-formaldehyde, melamine-urea-formaldehyde, phenol-urea-formaldehyde, a copolymer of acrylic acid and one or more unsaturated carboxylic acid monomers, a copolymer of acrylic acid and one or more hydroxyl containing unsaturated monomers, a copolymer of acrylic acid and one or more vinyl derived units, or any combination thereof.

63. The fiberglass mat according to paragraph 62, wherein the first copolymer is present in an amount ranging from about 1 wt % to about 99 wt %, based on a combined weight of the first and second copolymers.

64. The binder composition according to paragraph 62, wherein the first copolymer is present in an amount ranging from about 65 wt % to about 95 wt %, based on a combined weight of the first and second copolymers.

65. The binder composition according to paragraph 62, wherein the first copolymer is present in an amount ranging from about 35 wt % to about 65 wt %, based on a combined weight of the first and second copolymers.

66. The binder composition according to paragraph 62, wherein the first copolymer is present in an amount ranging from about 15 wt % to about 35 wt %, based on a combined weight of the first and second copolymers.

67. The fiberglass mat according to any one of paragraphs 60 to 66, wherein the one or more unsaturated carboxylic acids comprise maleic acid, wherein the one or more unsaturated carboxylic anhydrides comprise maleic anhydride, wherein the one or more vinyl aromatic derived units comprise styrene, and wherein the one or more base compounds comprise one or more amines, one or more amides, one or more hydroxides, one or more carbonates, or any combination thereof.

68. The fiberglass mat according to any one of paragraphs 60 to 67, wherein the one or more unsaturated carboxylic acids comprise maleic acid, wherein the one or more unsaturated carboxylic anhydrides comprise maleic anhydride, wherein the one or more vinyl aromatic derived units comprise styrene, and wherein the one or more base compounds comprise ammonia, monoethanolamine, diethanolamine, triethanolamine, or any combination thereof.

69. The fiberglass mat according to any one of paragraphs 60 to 68, wherein the binder composition, prior to at least partial curing, further comprises a second copolymer, wherein the second copolymer comprises urea-formaldehyde, and wherein the first copolymer is present in an amount ranging from about 1 wt % to about 99 wt % based on a combined weight of the first and second copolymers.

70. The fiberglass mat according to any one of paragraphs 60 to 69, wherein the binder composition has a solids concentration ranging from about 1 wt % to about 75 wt %.

71. The fiberglass mat according to any one of paragraphs 60 to 70, wherein the binder composition further comprises one or more carbohydrates, one or more polyols, or a combination thereof, and wherein the binder composition contains about 0.1 wt % to about 99.9 wt % of the first copolymer, about 0.1 wt % to about 99.9 wt % of the second copolymer, and from about 1 wt % to about 60 wt % of a combined weight of the one or more carbohydrates, the one or more polyols, or the combination thereof.

72. A binder composition, comprising: a first copolymer modified by reaction with one or more base compounds, wherein: the first copolymer comprises one or more unsaturated carboxylic acids, one or more unsaturated carboxylic anhydrides, or a combination thereof, and one or more vinyl aromatic derived units, the first copolymer has a weight average molecular weight (Mw) of about 500 to about 200,000, and the first copolymer is present in an amount ranging from about 60 wt % to about 95 wt %, based on a combined weight of the first copolymer and the one or more base compounds.

73. The binder composition according to paragraph 72, further comprising a second copolymer, wherein the second copolymer comprises urea-formaldehyde, phenol-formaldehyde, melamine-formaldehyde, phenol-resorcinol-formaldehyde, resorcinol-formaldehyde, melamine-urea-formaldehyde, phenol-urea-formaldehyde, a copolymer of acrylic acid and one or more unsaturated carboxylic acid monomers, a copolymer of acrylic acid and one or more hydroxyl containing unsaturated monomers, a copolymer of acrylic acid and one or more vinyl derived units, or any combination thereof, and wherein the first copolymer is present in an amount ranging from about 1 wt % to about 99 wt %, based on a combined weight of the first copolymer and the second copolymer.

74. The binder composition according to paragraph 72 or 73, wherein the one or more unsaturated carboxylic acids comprise maleic acid, wherein the one or more unsaturated carboxylic anhydrides comprise maleic anhydride, wherein the one or more vinyl aromatic derived units comprise styrene, and wherein the one or more base compounds comprise one or more amines, one or more amides, one or more hydroxides, one or more carbonates, or any combination thereof.

75. The binder composition according to any one of paragraphs 72 to 74, further comprising a liquid medium, wherein the liquid medium is present in an amount sufficient to produce a binder composition having a solids concentration ranging from about 5 wt % to about 40 wt %, based on a combined weight of the first copolymer and the one or more base compounds.

76. The binder composition according to any one of paragraphs 72 to 75, further comprising one or more carbohydrates, one or more polyols, or a combination thereof, wherein the binder composition contains about 0.1 wt % to about 99.9 wt % of the first copolymer, about 0.1 wt % to about 99.9 wt % of the second copolymer, and from about 1 wt % to about 60 wt % of a combined weight of the one or more carbohydrates, the one or more polyols, or the combination thereof, based on a combined weight of the first copolymer, the second copolymer, and the one or more carbohydrates, the one or more polyols, or the combination thereof.

77. A fiberglass mat, comprising: a plurality of glass fibers and an at least partially cured binder composition, wherein the binder composition, prior to at least partial curing, comprises: a first copolymer comprising styrene maleic anhydride modified by reaction with one or more base compounds, wherein the first copolymer has a weight average molecular weight (Mw) of about 500 to about 200,000, and wherein the styrene maleic anhydride is present in an amount ranging from about 60 wt % to about 95 wt %, based on a combined weight of the styrene maleic anhydride and the one or more base compounds.

78. The fiberglass mat according to paragraph 77, wherein the binder composition, prior to at least partial curing, further comprises a second copolymer, wherein the second copolymer comprises urea-formaldehyde, phenol-formaldehyde, melamine-formaldehyde, phenol-resorcinol-formaldehyde, resorcinol-formaldehyde, melamine-urea-formaldehyde, phenol-urea-formaldehyde, a copolymer of acrylic acid and one or more unsaturated carboxylic acid monomers, a copolymer of acrylic acid and one or more hydroxyl containing unsaturated monomers, a copolymer of acrylic acid and one or more vinyl derived units, or any combination thereof, and wherein the first copolymer is present in an amount ranging from about 1 wt % to about 99 wt %, based on a combined weight of the first and second copolymers.

79. The fiberglass mat according to paragraph 77 or 78, wherein the one or more base compounds comprise one or more amines, one or more amides, one or more hydroxides, one or more carbonates, or any combination thereof.

80. The fiberglass mat according to any one of paragraphs 77 to 79, wherein the plurality of glass fibers have a length ranging from about 3 mm to about 50 mm and a diameter ranging from about 5 μm to about 40 μm, and wherein the fiberglass mat has a thickness ranging from about 10 mils to about 1,000 mils, an average dry tensile strength of at least 50 lbs/3 inch, and an average Elmendorf tear strength of at least 300 gf.

81. A binder composition, comprising: a first copolymer comprising styrene maleic anhydride modified by reaction with one or more base compounds, wherein the first copolymer has a weight average molecular weight (Mw) of about 500 to about 200,000, and wherein the styrene maleic anhydride is present in an amount ranging from about 60 wt % to about 95 wt %, based on a combined weight of the styrene maleic anhydride and the one or more base compounds.

82. The binder composition according to paragraph 81, further comprising a second copolymer, wherein the second copolymer comprises urea-formaldehyde, phenol-formaldehyde, melamine-formaldehyde, phenol-resorcinol-formaldehyde, resorcinol-formaldehyde, melamine-urea-formaldehyde, phenol-urea-formaldehyde, a copolymer of acrylic acid and one or more unsaturated carboxylic acid monomers, a copolymer of acrylic acid and one or more hydroxyl containing unsaturated monomers, a copolymer of acrylic acid and one or more vinyl derived units, or any combination thereof, and wherein the first copolymer is present in an amount ranging from about 1 wt % to about 99 wt %, based on a combined weight of the first and second copolymers.

83. The binder composition according to paragraph 81 or 82, wherein the one or more base compounds comprise one or more amines, one or more amides, one or more hydroxides, one or more carbonates, or any combination thereof.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A fiberglass mat, comprising:
   a plurality of glass fibers and an at least partially cured binder composition, wherein the binder composition, prior to at least partial curing, is a thermosetting composition and comprises:
   a first copolymer modified by reaction with one or more base compounds, wherein:
      the first copolymer comprises one or more vinyl aromatic derived units and (1) one or more unsaturated carboxylic acids, (2) one or more unsaturated carboxylic anhydrides, or (3) one or more unsaturated carboxylic acids and one or more unsaturated carboxylic anhydrides,
      the one or more base compounds comprise ammonia, monoethanolamine, diethanolamine, triethanolamine, or any combination thereof,
      the first copolymer has a weight average molecular weight (Mw) of about 500 to about 200,000, and
      the first copolymer is present in an amount ranging from about 60 wt % to about 95 wt %, based on a combined weight of the first copolymer and the one or more base compounds.

2. The fiberglass mat of claim 1, wherein the plurality of glass fibers have a length ranging from about 3 mm to about 50 mm and a diameter ranging from about 5 μm to about 40 μm, and wherein the fiberglass mat has a thickness ranging from about 10 mils to about 1,000 mils, an average dry tensile strength of at least 50 lbs/3 inch, and an average Elmendorf tear strength of at least 300 gf.

3. The fiberglass mat of claim 1, wherein the binder composition, prior to at least partial curing, further comprises a second copolymer, and wherein the second copolymer comprises urea-formaldehyde, phenol-formaldehyde, melamine-formaldehyde, phenol-resorcinol-formaldehyde, resorcinol-formaldehyde, melamine-urea-formaldehyde, phenol-urea-formaldehyde, a copolymer of acrylic acid and one or more unsaturated carboxylic acid monomers, a copolymer of acrylic acid and one or more hydroxyl containing unsaturated monomers, a copolymer of acrylic acid and one or more vinyl derived units, or any combination thereof.

4. The fiberglass mat of claim 3, wherein the first copolymer is present in an amount ranging from about 1 wt % to about 99 wt %, based on a combined weight of the first and second copolymers, and wherein the first copolymer modified by reaction with one or more base compounds contains an imide group.

5. The binder composition of claim 3, wherein the first copolymer is present in an amount ranging from 50 wt % to about 95 wt %, based on a combined weight of the first and second copolymers.

6. The binder composition of claim 3, wherein the first copolymer is present in an amount ranging from about 35 wt % to about 65 wt %, based on a combined weight of the first and second copolymers.

7. The binder composition of claim 3, wherein the first copolymer is present in an amount ranging from about 15 wt % to about 35 wt %, based on a combined weight of the first and second copolymers.

8. The fiberglass mat of claim 1, wherein the one or more unsaturated carboxylic acids comprise maleic acid, wherein the one or more unsaturated carboxylic anhydrides comprise maleic anhydride, wherein the one or more vinyl aromatic derived units comprise styrene, and wherein the one or more base compounds further comprise one or more amides, one or more hydroxides, one or more carbonates, or any combination thereof.

9. The fiberglass mat of claim 1, wherein the binder composition, prior to at least partial curing, further comprises a second copolymer, wherein the second copolymer comprises urea-formaldehyde, wherein the first copolymer modified by reaction with the one or more base compounds is present in an amount ranging from about 45 wt % to about 75 wt % based on a combined weight of the first copolymer modified by reaction with the one or more base compounds and the second copolymer, wherein the one or more base compounds comprise ammonia, monoethanolamine, and triethanolamine, and wherein the first copolymer modified by reaction with the one or more base compounds is produced by reacting the first copolymer with the one or more base compounds at a temperature of about 85° C. to about 115° C.

10. The fiberglass mat of claim 1, wherein the binder composition has a solids concentration ranging from about 1 wt % to about 75 wt %, wherein the binder composition, prior to at least partial curing, further comprises a second copolymer, wherein the second copolymer comprises phenol-formaldehyde, phenol-resorcinol-formaldehyde, resorcinol-formaldehyde, phenol-urea-formaldehyde, or any combination thereof, and wherein the binder composition comprises about 85 wt % to about 99 wt % of the second copolymer, based on a combined weight of the first copolymer modified by reaction with the one or more base compounds and the second copolymer.

11. The fiberglass mat of claim 3, wherein the binder composition further comprises one or more carbohydrates, and wherein the binder composition contains about 0.1 wt % to about 99.9 wt % of the first copolymer, about 0.1 wt % to about 99.9 wt % of the second copolymer, and from about 1 wt % to about 60 wt % of the one or more carbohydrates, based on a combined weight of the first copolymer, the second copolymer, and the one or more carbohydrates.

12. A binder composition, comprising:
   a first copolymer modified by reaction with one or more base compounds, wherein:
      the first copolymer comprises one or more vinyl aromatic derived units and (1) one or more unsaturated carboxylic acids, (2) one or more unsaturated carboxylic anhydrides, or (3) one or more unsaturated carboxylic acids and one or more unsaturated carboxylic anhydrides, the one or more base compounds comprise ammonia, monoethanolamine, diethanolamine, triethanolamine, or any combination thereof, the first copolymer has a weight average molecular weight (Mw) of about 500 to about 200,000, the first copolymer is present in an amount ranging from about 60 wt % to about 95 wt %, based on a combined weight of the first copolymer and the one or more base compounds, the first copolymer is thermosetting, and the binder composition is a thermosetting composition.

13. The binder composition of claim 12, further comprising a second copolymer, wherein the second copolymer comprises urea-formaldehyde, phenol-formaldehyde, melamine-formaldehyde, phenol-resorcinol-formaldehyde, resorcinol-formaldehyde, melamine-urea-formaldehyde, phenol-urea-formaldehyde, a copolymer of acrylic acid and one or more unsaturated carboxylic acid monomers, a copolymer of acrylic acid and one or more hydroxyl containing unsaturated monomers, a copolymer of acrylic acid and one or more vinyl derived units, or any combination thereof, wherein the first copolymer is present in an amount ranging from about 1 wt % to about 99 wt %, based on a combined weight of the first copolymer and the second copolymer, and wherein the one or more unsaturated carboxylic acids comprise maleic acid, wherein the one or more unsaturated carboxylic anhydrides comprise maleic anhydride, and wherein the one or more vinyl aromatic derived units comprise styrene.

14. The binder composition of claim 12, wherein the one or more base compounds further comprise one or more amides, one or more hydroxides, one or more carbonates, or any combination thereof.

15. The binder composition of claim 3, wherein the binder composition further comprises one or more polyols, wherein the binder composition contains about 0.1 wt % to about 99.9 wt % of the first copolymer, about 0.1 wt % to about 99.9 wt % of the second copolymer, and from about 1 wt % to about 60 wt % of the one or more polyols, based on a combined weight of the first copolymer, the second copolymer, and the one or more carbohydrates, the one or more polyols, and wherein the one or more polyols comprise ethylene glycol, diethylene glycol, triethylene glycol, hydroxy terminated polyethylene oxide, pentaerythritol, trimethylol propane, a polyvinyl alcohol, pyrogallol, glycollated ureas, 1,4-cyclohexane diol, or any combination thereof.

16. The binder composition of claim 12, further comprising a liquid medium, wherein the liquid medium is present in an amount sufficient to produce a binder composition having a solids concentration ranging from about 5 wt % to about 40 wt %, based on a combined weight of the first copolymer and the one or more base compounds.

17. A fiberglass mat, comprising:

a plurality of glass fibers and an at least partially cured binder composition, wherein the binder composition, prior to at least partial curing, is a thermosetting composition and comprises:

a first copolymer modified by reaction with one or more base compounds, wherein the first copolymer comprises styrene maleic anhydride, wherein the one or more base compounds comprise ammonia, monoethanolamine, diethanolamine, triethanolamine, or any combination thereof, wherein the first copolymer has a weight average molecular weight (Mw) of about 500 to about 200,000, and wherein the styrene maleic anhydride is present in an amount ranging from about 60 wt % to about 95 wt %, based on a combined weight of the styrene maleic anhydride and the one or more base compounds.

18. The fiberglass mat of claim 17, wherein the binder composition, prior to at least partial curing, further comprises a second copolymer, wherein the second copolymer comprises urea-formaldehyde, phenol-formaldehyde, melamine-formaldehyde, phenol-resorcinol-formaldehyde, resorcinol-formaldehyde, melamine-urea-formaldehyde, phenol-urea-formaldehyde, a copolymer of acrylic acid and one or more unsaturated carboxylic acid monomers, a copolymer of acrylic acid and one or more hydroxyl containing unsaturated monomers, a copolymer of acrylic acid and one or more vinyl derived units, or any combination thereof, and wherein the first copolymer is present in an amount ranging from about 1 wt % to about 99 wt %, based on a combined weight of the first and second copolymers.

19. The fiberglass mat of claim 17, wherein the one or more base compounds further comprise one or more amides, one or more hydroxides, one or more carbonates, or any combination thereof.

20. The fiberglass mat of claim 1, wherein the first copolymer modified by reaction with the one or more base compounds contains an amide group, an imide group, or a mixture thereof, wherein the first copolymer has a weight average molecular weight (Mw) of about 1,000 to about 10,000, and wherein the first copolymer modified by reaction with the one or more base compounds is produced by reacting the first copolymer with the one or more base compounds at a temperature of about 85° C. to about 115° C.

21. The binder composition of claim 13, wherein the first copolymer modified by reaction with the one or more base compounds contains an amide group, an imide group, or a mixture thereof, and wherein the first copolymer is present in an amount ranging from 35 wt % to about 95 wt %, based on a combined weight of the first copolymer and the second copolymer.

22. The fiberglass mat of claim 1, wherein the binder composition, prior to at least partial curing, further comprises a second copolymer and at least one of a carbohydrate and a polyol, wherein the second copolymer comprises urea-formaldehyde, phenol-formaldehyde, or a combination thereof, wherein the carbohydrate comprises D-Glucose, glyceraldehyde, dextrin, maltodextrin, or any combination thereof, and wherein the polyol comprises ethylene glycol, diethylene glycol, triethylene glycol, hydroxy terminated polyethylene oxide, pentaerythritol, trimethylol propane, a polyvinyl alcohol, pyrogallol, glycollated ureas, 1,4-cyclohexane diol, or any combination thereof.

23. The fiberglass mat of claim 1, wherein the one or more base compounds comprise ammonia and at least one of monoethanolamine, diethanolamine, and triethanolamine.

* * * * *